United States Patent
Ohsugi et al.

(10) Patent No.: US 9,902,397 B2
(45) Date of Patent: Feb. 27, 2018

(54) TRANSPORTER VEHICLE AND TRANSPORTER VEHICLE CONTROL METHOD

(71) Applicant: Komatsu Ltd., Tokyo (JP)

(72) Inventors: Shigeru Ohsugi, Hiratsuka (JP); Motohide Sugihara, Fujisawa (JP); Shinji Mitsuta, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 288 days.

(21) Appl. No.: 14/401,616

(22) PCT Filed: Jul. 30, 2014

(86) PCT No.: PCT/JP2014/070138
§ 371 (c)(1),
(2) Date: Nov. 17, 2014

(87) PCT Pub. No.: WO2016/016980
PCT Pub. Date: Feb. 4, 2016

(65) Prior Publication Data
US 2016/0264134 A1 Sep. 15, 2016

(51) Int. Cl.
*B60W 30/00* (2006.01)
*B60W 30/09* (2012.01)
(Continued)

(52) U.S. Cl.
CPC ............. *B60W 30/09* (2013.01); *B60T 7/00* (2013.01); *B60T 7/22* (2013.01); *B60W 10/06* (2013.01); *B60W 10/18* (2013.01); *B60W 30/095* (2013.01); *G08G 1/166* (2013.01); *B60P 1/04* (2013.01); *B60T 2201/022* (2013.01);
(Continued)

(58) Field of Classification Search
None
See application file for complete search history.

(56) References Cited

U.S. PATENT DOCUMENTS 4,919,222 A * 4/1990 Kyrtsos .................... G01G 5/04
177/139
4,941,365 A 7/1990 Reiner et al.
(Continued)

FOREIGN PATENT DOCUMENTS

AU 2012372159 A1 12/2013
CA 2815822 A1 11/2013
(Continued)

OTHER PUBLICATIONS

Office Action dated Feb. 1, 2016, issued for the Canadian patent application No. 2,893,194.
(Continued)

*Primary Examiner* — Jonathan M Dager
(74) *Attorney, Agent, or Firm* — Locke Lord LLP

(57) ABSTRACT

A transporter vehicle includes: a vehicle; a vessel that is provided in the vehicle; a traveling state detection device that detects a traveling state of the vehicle; an object detection device that detects an object in front of the vehicle; and a collision determination unit that determines a possibility of collision with the object based on a loading state of a load of the vessel, a detection result of the traveling state detection device, and a detection result of the object detection device.

23 Claims, 15 Drawing Sheets

(51) Int. Cl.
  *B60W 10/06* (2006.01)
  *B60W 10/18* (2012.01)
  *B60W 30/095* (2012.01)
  *G08G 1/16* (2006.01)
  *B60T 7/00* (2006.01)
  *B60T 7/22* (2006.01)
  *B60P 1/04* (2006.01)

(52) U.S. Cl.
  CPC ..... *B60W 2300/12* (2013.01); *B60W 2520/10* (2013.01); *B60W 2530/10* (2013.01); *B60W 2600/00* (2013.01); *B60W 2710/18* (2013.01); *B60Y 2200/14* (2013.01); *B60Y 2200/145* (2013.01); *B60Y 2300/09* (2013.01); *B60Y 2300/095* (2013.01)

(56) References Cited

U.S. PATENT DOCUMENTS

| | | | | |
|---|---|---|---|---|
| 5,038,876 A * | 8/1991 | Smith | G01G 19/08 | 177/139 |
| 5,245,137 A * | 9/1993 | Bowman | B65F 3/04 | 177/1 |
| 5,509,293 A * | 4/1996 | Karumanchi | G01G 19/10 | 177/139 |
| 5,837,945 A * | 11/1998 | Cornwell | B65F 3/04 | 177/136 |
| 5,917,159 A * | 6/1999 | Kostiuk | G01G 23/3728 | 177/136 |
| 6,238,021 B1 * | 5/2001 | Sugimoto | B60T 7/22 | 180/169 |
| 6,324,462 B1 | 11/2001 | Kageyama | | |
| 6,442,484 B1 * | 8/2002 | Miller | B60R 21/0134 | 340/990 |
| 7,009,118 B2 * | 3/2006 | Pottebaum | G01G 19/12 | 177/136 |
| 7,018,004 B2 * | 3/2006 | Chen | B60T 7/22 | 188/1.11 R |
| 7,514,639 B2 * | 4/2009 | Heuer | B66C 13/16 | 177/147 |
| 7,565,234 B2 * | 7/2009 | Noda | B60T 7/22 | 701/301 |
| 8,203,459 B2 * | 6/2012 | Jones | G06Q 10/06 | 177/136 |
| 8,577,550 B2 * | 11/2013 | Lu | B60W 10/06 | 340/435 |
| 8,660,758 B2 * | 2/2014 | Janardhan | E02F 9/264 | 177/139 |
| 8,736,483 B2 | 5/2014 | Takeuchi | | |
| 8,738,228 B2 * | 5/2014 | Filev | B60W 50/08 | 701/36 |
| 8,868,327 B2 * | 10/2014 | Heinrichs-Bartscher | B60T 7/22 | 701/301 |
| 9,014,939 B1 * | 4/2015 | Mendenhall | E02F 9/24 | 342/455 |
| 9,297,690 B2 * | 3/2016 | Havimaki | A01G 23/00 | |
| 9,440,649 B2 * | 9/2016 | Ciotlos | B60W 30/085 | |
| 9,478,135 B2 * | 10/2016 | Fujishiro | B60T 7/22 | |
| 2004/0122578 A1 | 6/2004 | Isaji | B60T 7/12 | 701/70 |
| 2004/0133384 A1 * | 7/2004 | Allerding | G01G 19/10 | 702/173 |
| 2004/0254729 A1 * | 12/2004 | Browne | B60R 21/013 | 701/301 |
| 2005/0110673 A1 * | 5/2005 | Izumi | G01S 7/03 | 342/70 |
| 2006/0097570 A1 * | 5/2006 | Doerr | B60Q 1/44 | 303/193 |
| 2006/0152350 A1 * | 7/2006 | Swoboda | B60K 31/0008 | 340/435 |
| 2007/0067085 A1 * | 3/2007 | Lu | B60T 8/172 | 701/70 |
| 2008/0312834 A1 * | 12/2008 | Noda | B60T 7/22 | 701/301 |
| 2008/0319710 A1 * | 12/2008 | Hsu | G01G 19/083 | 702/174 |
| 2009/0127031 A1 * | 5/2009 | Corder | G01G 19/10 | 187/393 |
| 2009/0210114 A1 * | 8/2009 | Baumann | B60R 21/0132 | 701/45 |
| 2010/0023226 A1 * | 1/2010 | Ito | B60R 21/0134 | 701/46 |
| 2012/0235853 A1 | 9/2012 | Takeuchi | | |
| 2012/0239266 A1 * | 9/2012 | Kato | B60T 7/22 | 701/70 |
| 2014/0231153 A1 * | 8/2014 | Fukasu | E02F 9/26 | 177/25.13 |
| 2015/0151755 A1 * | 6/2015 | Ohmori | B60T 7/22 | 701/93 |
| 2015/0314784 A1 * | 11/2015 | Ohmori | B60T 7/22 | 701/70 |
| 2016/0104379 A1 * | 4/2016 | Reinards | A01D 75/185 | 340/435 |
| 2016/0214620 A1 * | 7/2016 | Yang | B60W 40/13 | |
| 2017/0061796 A1 * | 3/2017 | Osagawa | G08B 29/185 | |

FOREIGN PATENT DOCUMENTS

| | | |
|---|---|---|
| CN | 102666240 A | 9/2012 |
| JP | 05-225499 A | 9/1993 |
| JP | 6-15200 U | 2/1994 |
| JP | 6-51904 U | 7/1994 |
| JP | 2007-320358 A | 12/2007 |
| JP | 2009-166669 A | 7/2009 |
| JP | 2011-121491 A | 6/2011 |
| JP | 2013-241159 A | 12/2013 |
| WO | WO-2013/065415 A1 | 5/2013 |
| WO | WO-2013/175649 A1 | 11/2013 |

OTHER PUBLICATIONS

International Search Report and Written Opinion dated Oct. 28, 2014, issued for PCT/JP2014/070138.

* cited by examiner

LPA (DPA)

TRANSPORTER VEHICLE AND TRANSPORTER VEHICLE CONTROL METHOD

CROSS-REFERENCE TO RELATED APPLICATION

Patent Literature 1: Japanese Utility Model Application Laid-open No. 6-051904

BACKGROUND OF THE INVENTION

Field of the Invention

The present invention relates to a transporter vehicle and a transporter vehicle control method.

In a mining site of a mine, a transporter vehicle such as a dump truck is operated, and the transporter vehicle transports cut stones or the like. The transporter vehicle travels along a traveling road provided in the mine in a loading state where cut stones or the like are loaded on the transporter vehicle or an empty state where no load exists therein. When the traveling transporter vehicle collides with an object, the transporter vehicle is damaged, and hence the operation of transporting cut stones or the like is disturbed. Thus, the productivity of the mining site is degraded. For that reason, a collision prevention device disclosed in Patent Literature 1 is used in the transporter vehicle.

BRIEF SUMMARY OF THE INVENTION

Technical Problem

According to the collision prevention device of the traveling vehicle disclosed in Patent Literature 1, when an object is detected while the transporter vehicle travels, the traveling operation of the transporter vehicle is limited in order to prevent the collision with the object. When traveling operation of the transporter vehicle is excessively limited, there is a possibility that the work efficiency of the transporter vehicle may be degraded.

An aspect of the invention is to provide a transporter vehicle and a transporter vehicle control method capable of suppressing degradation in work efficiency while reducing damage caused by a collision with an object.

Solution to Problem

A first aspect of the present invention provides a transporter vehicle comprising: a vehicle; a vessel that is provided in the vehicle; a traveling state detection device that detects a traveling state of the vehicle; an object detection device that detects an object in front of the vehicle; and a collision determination unit that determines a possibility of collision with the object based on a loading state of a load of the vessel, a detection result of the traveling state detection device, and a detection result of the object detection device.

A second aspect of the present invention provides a transporter vehicle comprising: a vehicle; a vessel that is provided in the vehicle; a traveling state detection device that detects a traveling state of the vehicle; an object detection device that detects an object in front of the vehicle; a collision determination unit that determines a possibility of collision with the object based on a loading state of a load of the vessel, a detection result of the traveling state detection device, and a detection result of the object detection device; a variable setting unit that sets a deceleration of the vehicle based on the loading state of the load of the vessel; and a calculation unit that calculates, based on a traveling speed of the vehicle at a first point detected by the traveling state detection device and the deceleration set by the variable setting unit, a required stop distance between the first point and a second point where the vehicle can be stopped, calculates a stop distance passage time from a first time point at which the vehicle exists at the first point to a second time point at which the vehicle arrives at the second point when the vehicle travels by the required stop distance at the traveling speed, and calculates, based on a relative distance and a relative speed of the object and the vehicle at the first time point detected by the object detection device, an object arrival time from the first time point to a third time point at which the vehicle arrives at the object when the vehicle travels by the relative distance at the relative speed from the first time point, wherein the collision determination unit estimates a time until the collision with the object occurs based on the deceleration set by the variable setting unit, the detection result of the traveling state detection device, and the detection result of the object detection device to determine the possibility of collision based on the stop distance passage time and the object arrival time.

A third aspect of the present invention provides a transporter vehicle control method comprising: detecting a traveling state of a transporter vehicle including a vessel by a traveling state detection device provided in the transporter vehicle; detecting an object in front of the transporter vehicle by an object detection device provided in the transporter vehicle; and determining a possibility of collision between the transporter vehicle and the object based on a loading state of a load of the vessel, a detection result of the traveling state detection device, and a detection result of the object detection device.

Advantageous Effects of Invention

According to the aspect of the invention, it is possible to provide a transporter vehicle and a transporter vehicle control method capable of suppressing degradation in work efficiency while reducing damage caused by a collision with an object.

BRIEF DESCRIPTION OF THE SEVERAL VIEWS OF THE DRAWING(S)

DETAILED DESCRIPTION OF THE INVENTION

Hereinafter, embodiments of the invention will be described with reference to the drawings, but the invention is not limited thereto. The components of the embodiments described below may be appropriately combined. Further, a part of the components may not be used in some cases.

First Embodiment

A first embodiment will be described.

(Mining Site of Mine)

Figure 1:
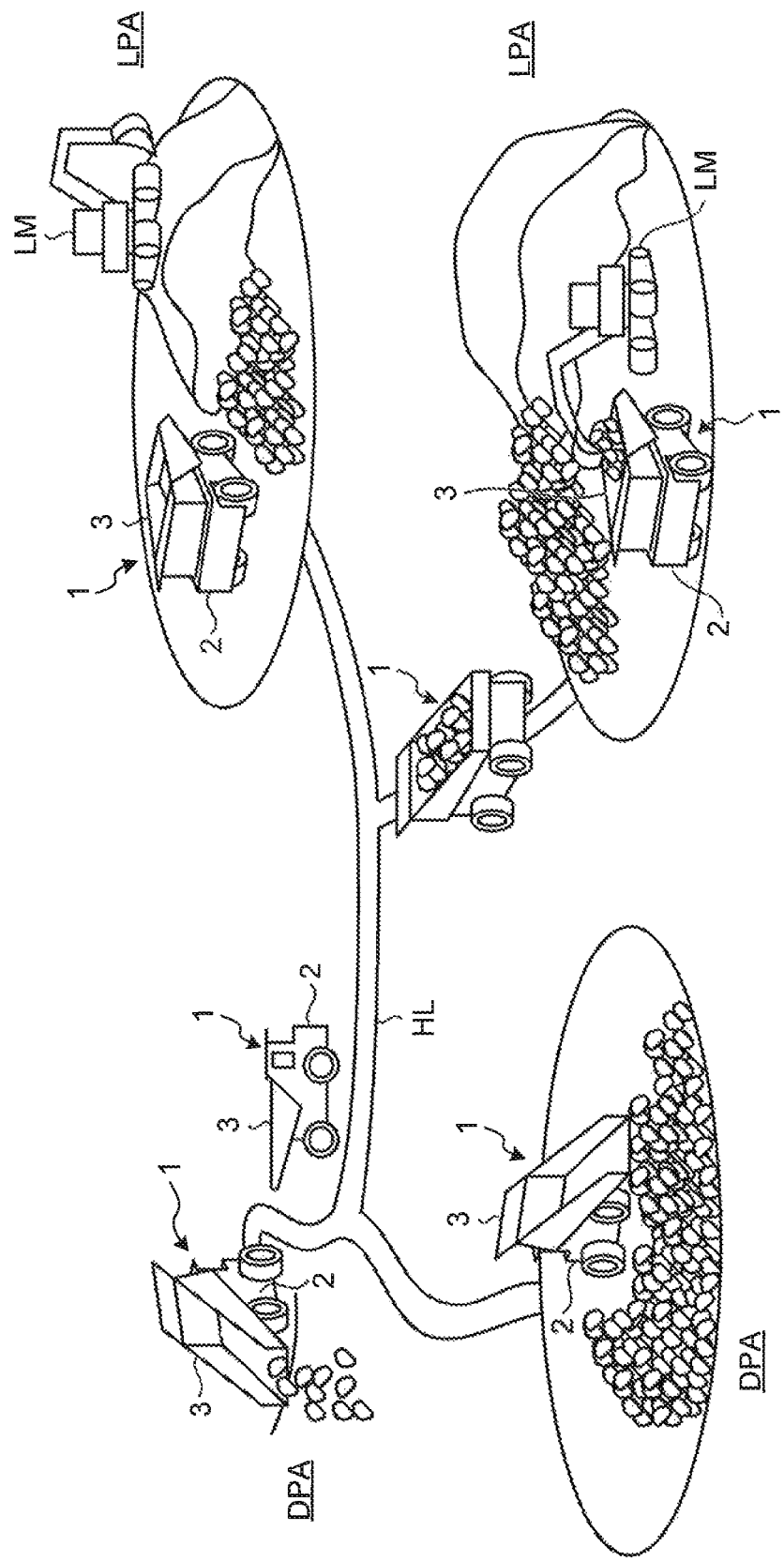
FIG. 1 is a schematic view illustrating an example of a mining site of a mine.

FIG. 1 is a schematic view illustrating an example of a mining site of a mine where a transporter vehicle according to the embodiment is movable. The transporter vehicle is a dump truck 1 that includes a vehicle 2 and a vessel 3 provided in the vehicle 2. The dump truck 1 transports a load loaded on the vessel 3. The load includes mined cut stone or at least one of soil and ore.

In the mining site of the mine, a traveling road HL is provided so as to be connected to a loading field LPA and a soil disposal field DPA or at least one of the loading field LPA and the soil disposal field DPA. The dump truck 1 may travel on at least one of the loading field LPA, the soil disposal field DPA, and the traveling road HL. The dump truck 1 may move between the loading field LPA and the soil disposal field DPA while traveling along the traveling road HL.

In the loading field LPA, a load may be loaded on the vessel 3. The load may be loaded on the vessel 3 by a loading machine LM. An excavator or a wheel loader is used as the loading machine LM. The dump truck 1 on which the load is loaded travels along the traveling road HL from the loading field LPA to the soil disposal field DPA. In the soil disposal field DPA, a load is discharged from the vessel 3. The dump truck 1 from which the load is discharged travels along the traveling road HL from the soil disposal field DPA to the loading field LPA. Furthermore, the dump truck 1 may travel from the soil disposal field DPA to a predetermined waiting station.

(Dump Truck)

Figure 2:
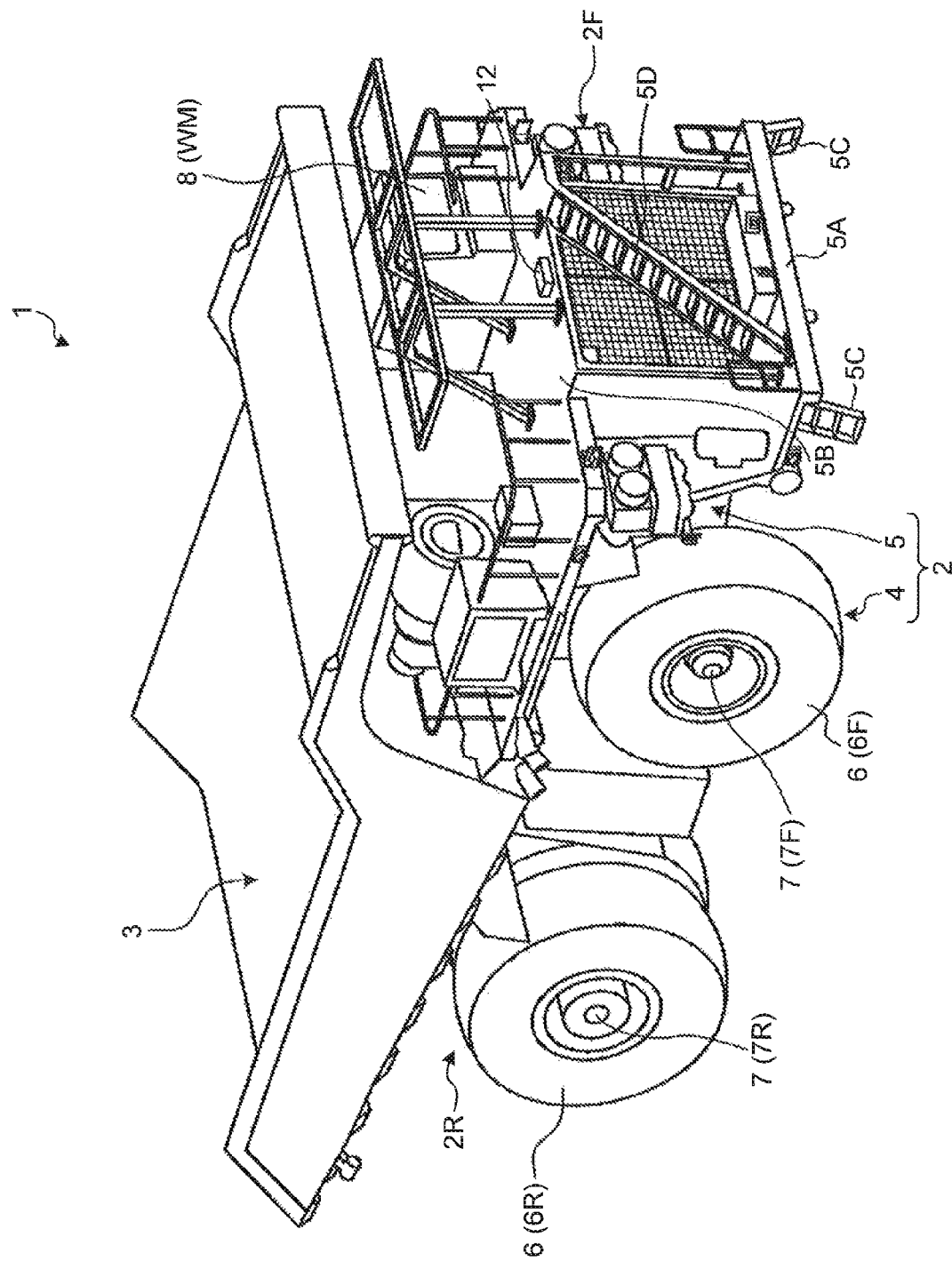
FIG. 2 is a perspective view illustrating an example of a transporter vehicle.

Next, the dump truck 1 will be described. FIG. 2 is a perspective view illustrating an example of the dump truck 1 according to the embodiment.

The dump truck 1 is a manned dump truck which is operated by an operator WM sitting in a cab (a driving room) 8. The dump truck 1 may be referred to as an off-highway truck. The dump truck 1 is a rigid dump truck 1.

The dump truck 1 includes the vehicle 2 which includes a front part 2F and a rear part 2R and the vessel 3 which is provided in the vehicle 2. The vehicle 2 includes a traveling device 4 and a vehicle body 5 of which at least a part is disposed above the traveling device 4. The vessel 3 is supported by the vehicle body 5.

The traveling device 4 includes a vehicle wheel 6 and an axle 7 which rotatably supports the vehicle wheel 6. The vehicle wheel 6 includes a wheel which is supported by the axle 7 and a tire which is supported by the wheel. The vehicle wheel 6 includes a front wheel 6F and a rear wheel 6R. The axle 7 includes an axle 7F which rotatably supports the front wheel 6F and an axle 7R which rotatably supports the rear wheel 6R.

The vehicle body 5 includes a lower deck 5A, an upper deck 5B, a ladder 5C which is disposed below the lower deck 5A, and a ladder 5D which is disposed so as to connect the lower deck 5A and the upper deck 5B. The lower deck 5A is disposed at the lower portion of the front part of the vehicle body 5. The upper deck 5B is disposed above the lower deck 5A in the front part of the vehicle body 5.

The vehicle 2 includes a cab 8. The cab 8 is disposed on the upper deck 5B. The operator WM sits in the cab 8, and operates the dump truck 1. The operator WM may be elevated with respect to the cab 8 by using the ladder 5C. The operator WM may move between the lower deck 5A and the upper deck 5B by using the ladder 5D.

The vessel 3 is a member on which a load is loaded. The vessel 3 may be elevated in the vertical direction with respect to the vehicle 2 by an elevation device. The elevation device includes an actuator such as a hydraulic cylinder (a hoist cylinder) disposed between the vessel 3 and the vehicle body 5. When the vessel 3 is moved upward by the elevation device, the load of the vessel 3 is discharged.

(Cab)

Figure 3:
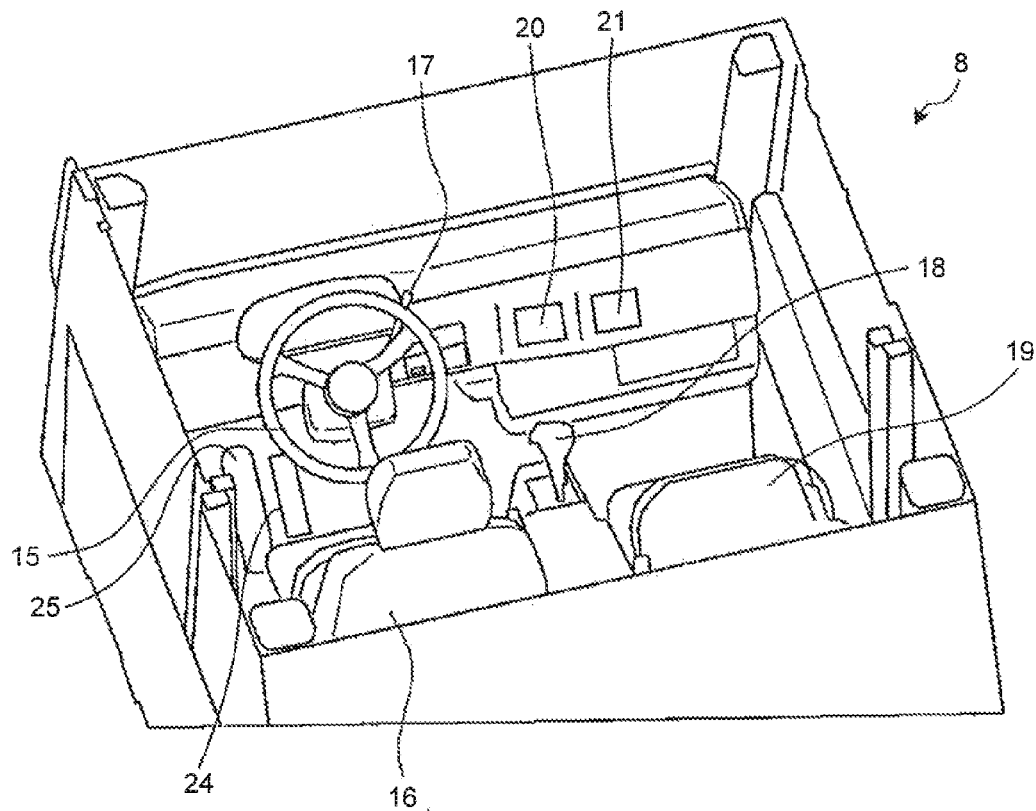
FIG. 3 is a view illustrating an example of a cab.

Next, the cab 8 will be described. FIG. 3 is a view illustrating an example of the cab 8 according to the embodiment. As illustrated in FIG. 3, the cab 8 is provided with a driver seat 16, a trainer seat 19, an output operation unit 24, a brake operation unit 25, a traveling direction operation unit 15, a speed stage operation unit 18, a retarder operation unit 17, a display device 20 such as a flat panel display, and an alarm device 21 which generates an alarm.

(Collision Prevention System)

Next, a collision prevention system 300S according to the embodiment will be described. In the embodiment, the dump truck 1 includes the collision prevention system 300S capable of performing a process for reducing damage caused by the collision between the dump truck 1 and an object in front of the dump truck 1.

Figure 4:
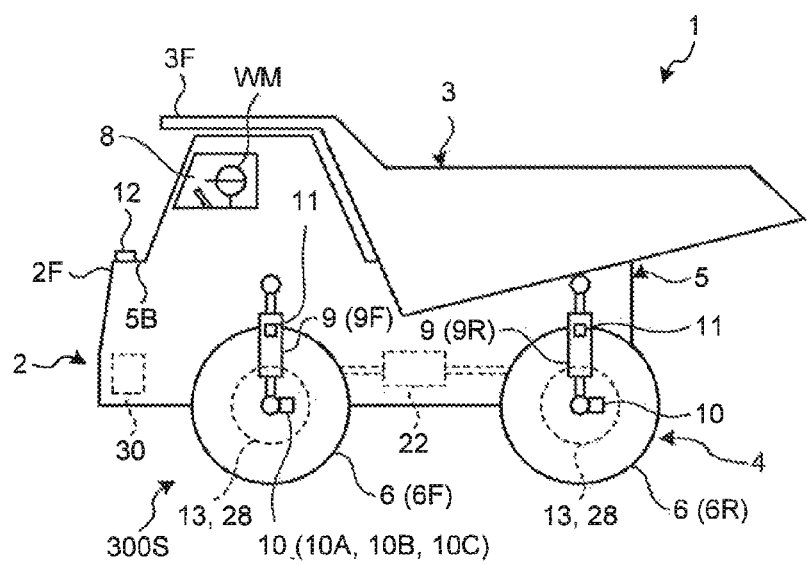
FIG. 4 is a schematic view illustrating an example of the transporter vehicle.
Figure 5:
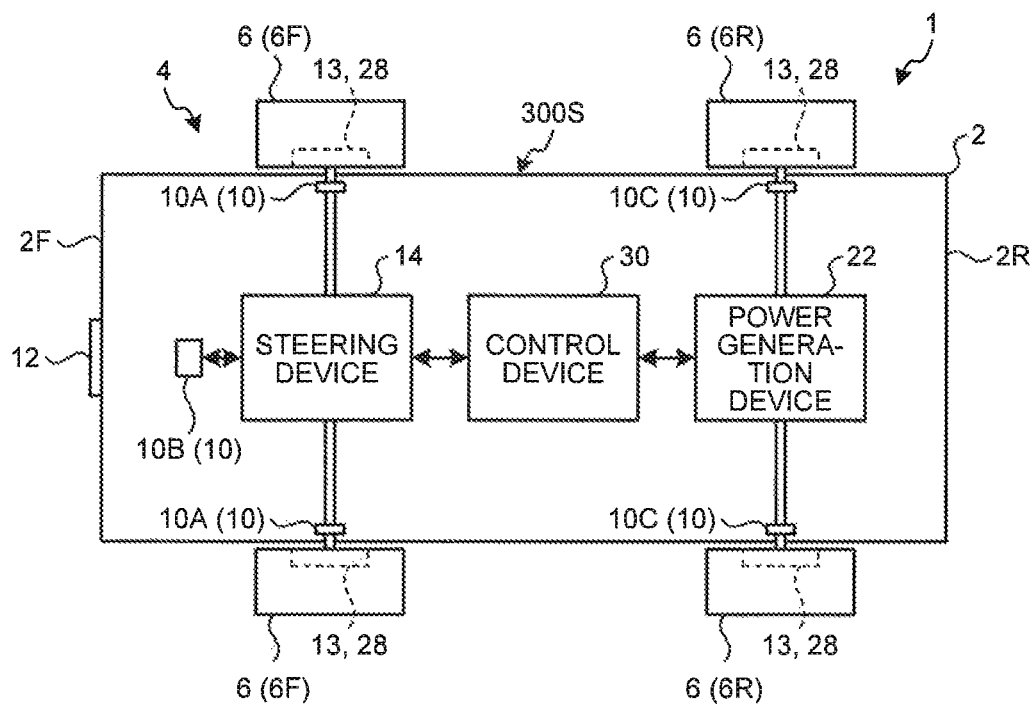
FIG. 5 is a schematic view illustrating an example of the transporter vehicle.
Figure 7:
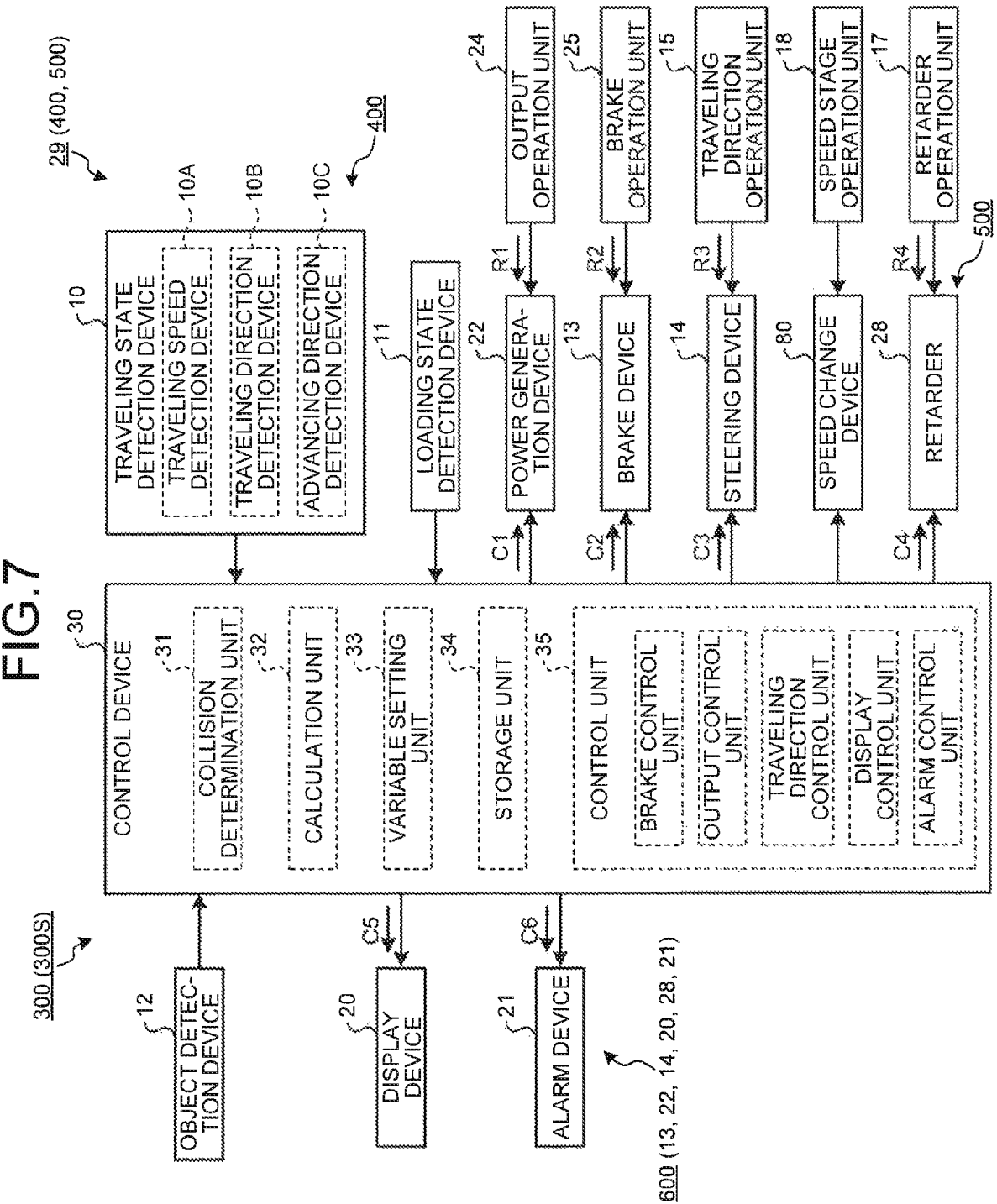
FIG. 7 is a functional block diagram illustrating an example of a control system.

FIGS. 4 and 5 are schematic views illustrating an example of the dump truck 1 according to the embodiment. Furthermore, a speed change device 80 illustrated in FIG. 7 is not illustrated in FIG. 5. The dump truck 1 includes a traveling state detection device 10 which detects the traveling state of the dump truck 1 (the vehicle 2), a loading state detection device 11 which detects the loading state of the load of the vessel 3, an object detection device 12 which detects an object in front of the dump truck 1 (the vehicle 2), and a control device 30 which controls the dump truck 1. The collision prevention system 300S includes the object detection device 12. The detection result of the traveling state detection device 10, the detection result of the loading state detection device 11, and the detection result of the object detection device 12 are output to the control device 30. The control device 30 performs a process for preventing the collision between the dump truck 1 and the object based on the detection result.

The traveling state of the dump truck 1 includes at least one of the traveling speed of the dump truck 1, the traveling direction (the direction of the front part 2F or the front wheel 6F) of the dump truck 1, and the advancing direction (the forward or backward movement direction) of the dump truck 1.

The loading state of the load of the vessel 3 includes at least one of the state whether a load is loaded on the vessel 3 and the weight of the load.

The dump truck 1 includes a power generation device 22 which generates a power, a suspension cylinder 9 of which a part is connected to the traveling device 4, and a brake device 13 which stops the traveling device 4.

The traveling device 4 is driven by the power generated by the power generation device 22. In the embodiment, the power generation device 22 drives the traveling device 4 in an electrical drive manner. The power generation device 22 includes an internal-combustion engine such as a diesel engine, a generator which is operated by the power of the internal-combustion engine, and a motor which is operated by the power generated by the generator. The power which is generated by the motor is transmitted to the vehicle wheel 6 of the traveling device 4. Accordingly, the traveling device 4 is driven. The self-running operation of the dump truck 1 is performed by the power of the power generation device 22 provided in the vehicle 2.

Furthermore, the power generation device 22 may drive the traveling device 4 in a mechanical drive manner. For example, the power which is generated by the internal-combustion engine may be transmitted to the vehicle wheel 6 of the traveling device 4 through a power transmission device.

The traveling device 4 includes a steering device 14 which changes the traveling direction (the direction of the front part 2F) of the dump truck 1. The steering device 14 changes the traveling direction of the dump truck 1 by changing the direction of the front wheel 6F.

The power generation device 22 is operated by the output operation unit 24 provided in the cab 8. The output operation unit 24 includes a pedal operation unit such as an accelerator pedal. The operator WM may adjust the output of the power generation device 22 by operating the output operation unit 24. When the output of the power generation device 22 is adjusted, the traveling speed of the dump truck 1 is adjusted.

The brake device 13 is operated by the brake operation unit 25 provided in the cab 8. The brake operation unit 25 includes a pedal operation unit such as a brake pedal. The operator WM may operate the brake device 13 by operating the brake operation unit 25. When the brake device 13 is operated, the traveling speed of the dump truck 1 is adjusted.

The steering device 14 is operated by the traveling direction operation unit 15 provided in the cab 8. The traveling direction operation unit 15 is, for example, a handle, and includes a handle operation unit. The operator WM may operate the steering device 14 by operating the traveling direction operation unit 15. When the steering device 14 is operated, the traveling direction of the dump truck 1 is adjusted.

Further, the speed change device 80 is, for example, a transmission, and is operated by the speed stage operation unit 18 provided in the cab 8. The speed stage operation unit 18 includes a lever operation unit such as a shift lever. The operator WM may change the advancing direction of the traveling device 4 by operating the speed stage operation unit 18. When the speed stage operation unit 18 is operated, the speed change device 80 changes the rotation direction in order to cause the dump truck 1 to move forward or backward.

The suspension cylinder 9 is disposed between the vehicle wheel 6 and the vehicle body 5. The suspension cylinder 9 includes a suspension cylinder 9F which is disposed between the front wheel 6F and the vehicle body 5 and a suspension cylinder 9R which is disposed between the rear wheel 6R and the vehicle body 5. That is, the suspension cylinder 9 is provided in each of four vehicle wheels 6 disposed at the front, rear, left, and right positions. A load based on the weight of the vehicle body 5 and the load acts on the vehicle wheel 6 through the suspension cylinder 9.

The traveling state detection device 10 includes a traveling speed detection device 10A which detects the traveling speed of the dump truck 1, a traveling direction detection device 10B which detects the traveling direction of the dump truck 1, and an advancing direction detection device 10C which detects whether the dump truck 1 moves forward or backward.

The traveling speed detection device 10A detects the traveling speed of the dump truck 1 (the vehicle 2). The traveling speed detection device 10A includes a rotation speed sensor which detects the rotation speed of the vehicle wheel 6 (the axle 7). The rotation speed of the vehicle wheel 6 is involved with the traveling speed of the dump truck 1. The detection value (the rotation speed value) of the rotation speed sensor is converted into the traveling speed value of the dump truck 1. The traveling speed detection device 10A detects the traveling speed of the dump truck 1 based on the detection value of the rotation speed sensor.

The traveling direction detection device 10B detects the traveling direction of the dump truck 1 (the vehicle 2). The traveling direction of the dump truck 1 includes the direction of the front part (the front surface) 2F of the vehicle 2 when the dump truck 1 moves forward. The traveling direction of the dump truck 1 includes the direction of the front wheel 6F when the dump truck 1 moves forward. The traveling direction detection device 10B includes a steering sensor which detects the steering angle of the steering device 14. For example, a rotary encoder may be used as the steering sensor. The traveling direction detection device 10B detects the steering angle by detecting the operation amount of the steering device 14. The traveling direction detection device 10B detects the traveling direction of the dump truck 1 by using the steering sensor. Furthermore, the traveling direction detection device 10B may include a rotation amount sensor which detects the steering angle or the rotation amount of the traveling direction operation unit 15. That is, the steering angle of the traveling direction operation unit 15 involves with the steering angle of the steering device 14 of the dump truck 1.

The advancing direction detection device 10C detects the advancing direction of the dump truck 1 (the vehicle 2). The advancing direction detection device 10C detects whether the dump truck 1 moves forward or backward. When the dump truck 1 moves forward, the front part 2F of the vehicle 2 is located at the front side in the advancing direction. When the dump truck 1 moves backward, the rear part 2R of the vehicle 2 is located at the front side in the advancing direction. The advancing direction detection device 10C includes a rotation direction sensor which detects the rotation direction of the vehicle wheel 6 (the axle 7). The advancing direction detection device 10C detects whether the dump truck 1 moves forward or backward based on the detection value of the rotation direction sensor. Furthermore, the advancing direction detection device 10C may include a sensor which detects the operation state of the speed stage operation unit 18.

The loading state detection device 11 detects at least one of the state whether a load is loaded on the vessel 3 and the weight of the load. The loading state detection device 11 includes a weight sensor which detects the weight of the vessel 3. The weight of the empty vessel 3 is given information. The loading state detection device 11 may obtain the weight of the load loaded on the vessel 3 based on the detection value of the weight sensor and the weight value of the empty vessel 3 as given information. That is, the weight of the load may be obtained by subtracting the weight value of the vessel 3 from the detection value.

In the embodiment, the weight sensor of the loading state detection device 11 includes a pressure sensor which detects the pressure of the working oil in the space inside the suspension cylinder 9. The pressure sensor detects a load acting on the suspension cylinder 9 by detecting the pressure of the working oil. The suspension cylinder 9 includes a cylinder portion and a piston portion which is movable relative to the cylinder portion. The working oil is enclosed in the inner space between the cylinder portion and the piston portion. When a load is loaded on the vessel 3, the cylinder portion and the piston portion move relatively so that the pressure of the working oil in the inner space increases. When a load is discharged from the vessel 3, the cylinder portion and the piston portion move relatively so that the pressure of the working oil in the inner space decreases. The pressure sensor detects the pressure of the working oil. The pressure of the working oil is involved with the weight of the load. The detection value (the pressure value) of the pressure sensor is converted into the weight of the load value. The loading state detection device 11 detects the weight of the load based on the detection value of the pressure sensor (the weight sensor).

In the embodiment, the pressure sensor is disposed in each of the plurality of suspension cylinders 9. The dump truck 1 includes four vehicle wheels 6. The pressure sensor is disposed in each of the suspension cylinders 9 provided in four vehicle wheels 6. The loading state detection device 11 may obtain the weight of the load based on the sum value or the average value of the detection values of four pressure sensors. The loading state detection device 11 may obtain the weight of the load based on the detection value of a specific pressure sensor (for example, the pressure sensor disposed in the suspension cylinder 9R) among four pressure sensors.

Furthermore, the load transportation amount of the dump truck 1 per unit time may be managed based on the detection result of the pressure sensor (the weight sensor) of the loading state detection device 11. For example, the load transportation amount (the working amount) of the dump truck 1 for one day may be stored in a storage device mounted on the dump truck 1 and managed based on the detection result of the pressure sensor.

Furthermore, the loading state detection device 11 may be configured as a weight sensor disposed between the vessel 3 and the vehicle body 5. The weight sensor may be a strain gauge type load cell provided between the vessel 3 and the vehicle body 5. The loading state detection device 11 may be configured as a pressure sensor which detects the hydraulic pressure of the hydraulic cylinder (the hoist cylinder) raising the vessel 3.

The object detection device 12 detects an object existing in front of the dump truck 1 (the vehicle 2) in a non-contact state. The object detection device 12 includes a radar device (a millimeter wave radar device). The radar device may detect not only the state whether the object exists at the front side, but also the relative position (the relative distance and the orientation) of the object and the relative speed of the object by sending an electric wave (or an ultrasonic wave) and receiving the electric wave (or the ultrasonic wave) reflected from the object. Furthermore, the object detection device 12 may include at least one of a laser scanner and a three-dimensional distance sensor. Further, the object detection device 12 may be provided at a plurality of positions.

The object detection device 12 is disposed in the front part 2F of the vehicle 2. In the embodiment, as illustrated in FIG. 2, the object detection device 12 is disposed in the upper deck 5B. Furthermore, the object detection device 12 may detect the object in front of the dump truck 1. The object detection device 12 may be disposed in the lower deck 5A.

Furthermore, since the upper deck 5B is provided with the object detection device 12, it is possible to prevent a problem in which an unevenness existing on a road surface (a ground surface) contacting the vehicle wheel 6 is erroneously detected as an object by the object detection device 12 even when the unevenness exists. Furthermore, when an electric wave is emitted from the radar device, the strength of the electric wave emitted from the unevenness of the road surface is smaller than the strength of the electric wave reflected from the object as the detection target. The laser device may include a filter device which receives a large-strength electric wave and cuts a low-strength electric wave so that the electric wave reflected from the object is received and the electric wave reflected from the unevenness of the road surface is not erroneously detected.

Figure 6:
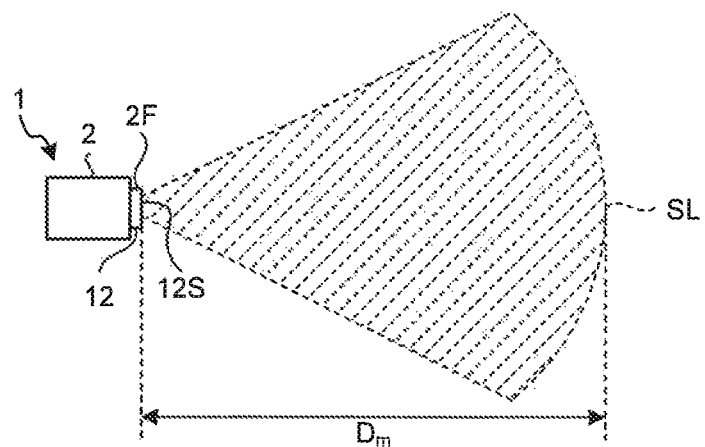
FIG. 6 is a schematic view illustrating an example of an object detection device.

FIG. 6 is a schematic view illustrating an example of the object detection device 12 according to the embodiment. As illustrated in FIG. 6, the object detection device 12 includes a radar device (a millimeter wave radar device) which is disposed in the front part 2F of the vehicle 2. The radar device includes a detection area SL capable of detecting an object in front of the dump truck 1. The detection area SL includes a radial area which extends from an emission portion 12S in the vertical and width directions as indicated by the diagonal line of FIG. 6. The object detection device 12 may detect an object existing in the detection area SL. In the traveling direction of the dump truck 1, the dimension of the detection area SL of the object detection device 12 is indicated by Dm. The dimension Dm is a distance between the front end of the detection area SL and the emission portion 12S of the object detection device 12 emitting at least one of an electric wave and an ultrasonic wave.

(Control System)

Next, an example of a control system 300 of the dump truck 1 according to the embodiment will be described. FIG. 7 is a functional block diagram illustrating an example of the control system 300 according to the embodiment. The control system 300 includes the collision prevention system 300S.

As illustrated in FIG. 7, the control system 300 includes the control device 30 which controls the dump truck 1 and a vehicle control device 29 which is connected to the control device 30. The vehicle control device 29 includes a state quantity detection system 400 which detects the state quantity of the dump truck 1 and a traveling condition adjustment system 500 which adjusts the traveling condition of the dump truck 1. The state quantity detection system 400 includes, for example, the traveling state detection device 10 and the loading state detection device 11. The traveling condition adjustment system 500 includes, for example, the power generation device 22, the brake device 13, the traveling device 4 (the steering device 14), and a retarder 28. The object detection device 12, the display device 20, and the alarm device 21 are connected to the control device 30. Furthermore, the brake device 13 and the retarder 28 are both braking devices which perform a brake process for decelerating or stopping the dump truck 1.

The output operation unit 24 is connected to the power generation device 22. The brake operation unit 25 is connected to the brake device 13. The traveling direction operation unit 15 is connected to the steering device 14. The speed stage operation unit 18 is connected to the traveling device 4. The retarder operation unit 17 is connected to the retarder 28. Furthermore, in the embodiment, the braking device configured as the retarder 28 and the braking device configured as the brake device 13 correspond to a common braking mechanism, and a braking operation may be performed by the common braking device even when the operator WM operates the brake operation unit 25 or the retarder operation unit 17. Furthermore, the retarder 28 controls the braking force so that the dump truck 1 travels at a constant speed when the dump truck moves down along a sloping road. When the dump truck moves down along the sloping road, the braking device exhibits a predetermined braking force by the operation of the retarder 28 using the retarder operation unit 17 operated by the operator WM. Further, the retarder 28 adjusts the braking force of the braking device in response to the traveling speed detected by the traveling speed detection device 10A. Furthermore, the retarder 28 may be configured as a braking device different from the brake device 13. For example, the braking device may include a fluid type retarder or an electromagnetic type retarder.

The control device 30 includes a numerical calculator such as a CPU (Central Processing Unit) or a storage device such as a memory. The control device 30 includes a collision determination unit 31 which determines the possibility of collision between the dump truck 1 and the object in front of the dump truck 1, a calculation unit 32 which calculates the time information used for the determination of the possibility of collision, a variable setting unit 33 which sets the variable used in for the determination of the possibility of collision, and a control unit 35 which outputs a control signal C for reducing damage caused by the collision.

The control device 30 includes a storage unit 34 which stores information used to determine the possibility of the collision. The storage unit 34 includes at least one of a RAM (Random Access Memory), a ROM (Read Only Memory), a flash memory, and a hard disk.

The traveling state detection device 10 detects the traveling state of the dump truck 1 and outputs the detection result to the collision determination unit 31. The loading state detection device 11 detects the loading state of the load of the vessel 3 and outputs the detection result to the collision determination unit 31. The object detection device 12 detects the object in front of the dump truck 1 and outputs the detection result to the collision determination unit 31. The collision determination unit 31 determines the possibility of collision between the dump truck 1 and the object based on the detection result of the traveling state detection device 10, the detection result of the loading state detection device 11, and the detection result of the object detection device 12.

The dump truck 1 includes a process system 600 capable of performing a process for reducing damage caused by the collision with the object. The process system 600 includes a plurality of process devices capable of performing different processes for reducing damage caused by the collision between the dump truck 1 and the object. In the embodiment, the process device of the process system 600 includes at least one of, for example, the brake device 13, the power generation device 22, the steering device 14, the display device 20, the retarder 28, and the alarm device 21. The brake device 13, the power generation device 22, the steering device 14, the display device 20, and the alarm device 21 may respectively perform different processes for reducing damage caused by the collision. The process system 600 is controlled by the control device 30.

The brake device 13 may decrease the traveling speed of the dump truck 1 or stop the traveling dump truck 1 by performing a brake process (a stop process) on the traveling device 4. Accordingly, damage caused by the collision between the dump truck 1 and the front object is reduced.

The power generation device 22 may decrease the traveling speed of the dump truck 1 by performing an output reduction process for reducing the output (the driving force) with respect to the traveling device 4. Accordingly, damage caused by the collision between the dump truck 1 and the front object is reduced.

The steering device 14 changes the traveling direction of the dump truck 1 so that an object does not exist on the traveling road of the dump truck 1 by performing the traveling direction change process of the dump truck 1 in response to a control signal C3 described below from the control unit (the traveling direction control unit) 35 or an operation signal R3 described below from the traveling direction operation unit 15. Accordingly, damage caused by the collision between the dump truck 1 and the front object is reduced.

The display device 20 may perform, for example, a display process for refreshing the attention of the operator WM. The display device 20 may generate an alarm for the operator WM by displaying an alarm image. The alarm image may be, for example, an alarm mark or a message for notifying the possibility of the collision with the object existing at the front side. Accordingly, an operation for reducing damage caused by the collision with the operator WM, for example, an operation of at least one of the output operation unit 24, the brake operation unit 25, and the traveling direction operation unit 15 is performed, and hence damage caused by the collision between the dump truck 1 and the front object is reduced.

The alarm device 21 may perform an alarm generation process for refreshing the attention of the operator WM. The alarm device 21 may generate an alarm for the operator WM by making a sound or light for notifying the possibility of the collision with the object existing at the front side by using, for example, a speaker or a lamp. The alarm device 21 may include a vibration generation device capable of generating an alarm for the operator WM by vibrating at least one of the traveling direction operation unit 15 and the driver seat 16. The alarm device 21 may include a seat belt adjustment device capable of generating an alarm for the operator WM by changing the binding force of the seat belt used to protect the operator WM sitting on the driver seat 16. Accordingly, an operation for reducing damage caused by the collision is performed by the operator WM, and hence damage caused by the collision between the dump truck 1 and the front object is reduced.

The control unit 35 outputs the control signal C for reducing damage caused by the collision to the process system 600 (at least one of the brake device 13, the power generation device 22, the steering device 14, the display device 20, the retarder 28, and the alarm device 21) based on the determination result of the collision determination unit 31. The process system 600 to which the control signal C is supplied from the control unit 35 performs a process for reducing damage caused by the collision between the dump truck 1 and the object.

When it is determined that there is a high possibility that the dump truck 1 and the object may collide with each other, the control unit (the output control unit) 35 may output the control signal C1 to the power generation device 22 so that the output reduction process is performed. The power generation device 22 reduces the output based on the control signal C1 supplied from the control unit 35 and reduces the driving force with respect to the traveling device 4. Accordingly, the traveling speed of the dump truck 1 is decreased, and hence damage caused by the collision between the dump truck 1 and the object is reduced.

When it is determined that there is a high possibility of the collision between the dump truck 1 and the object, the control unit (the brake control unit) 35 outputs a control signal C4 to the retarder 28 so that a brake process is performed. The retarder 28 is operated based on the control signal C4 supplied from the control unit 35. Here, when it is determined that there is a high possibility of the collision between the dump truck 1 and the object, the control unit (the brake control unit) 35 may output a control signal C2 to the brake device 13. Accordingly, the traveling speed of the dump truck 1 is decreased or the traveling dump truck 1 is stopped, and hence damage caused by the collision between the dump truck 1 and the object is reduced.

When it is determined that there is a high possibility that the dump truck 1 and the object may collide with each other, the control unit (the traveling direction control unit) 35 may output the control signal C3 to the steering device 14 so that the traveling direction change process is performed. The steering device 14 is operated based on the control signal C3 supplied from the control unit 35. Accordingly, the traveling direction of the dump truck 1 is changed so that an object does not disposed in the traveling road of the dump truck 1, and hence damage caused by the collision between the dump truck 1 and the object is reduced.

When it is determined that there is a high possibility that the dump truck 1 and the object may collide with each other, the control unit (the alarm control unit) 35 may output a control signal C6 to the alarm device 21 so that the alarm generation process is performed. As described above, the alarm device 21 is operated based on the control signal C6 supplied from the control unit 35. The alarm device 21 generates a sound or light for refreshing the attention of the operator WM. Accordingly, any operation for reducing damage caused by the collision with the operator WM is performed, and the operation signals R (R1, R2, R3, and R4) caused by the operation are supplied to the process system 600. Accordingly, damage caused by the collision between the dump truck 1 and the object is reduced.

When it is determined that there is a high possibility that the dump truck 1 and the object may collide with each other, the control unit (the display control unit) 35 may output a control signal C5 to the display device 20 so that the display process is performed as described above. The display device 20 is operated based on the control signal C5 supplied from the control unit 35. The display device 20 displays an image for refreshing the attention of the operator WM. Accordingly, any operation for reducing damage caused by the collision with the operator WM is performed, and the operation signals R (R1, R2, R3, and R4) caused by the operation are supplied to the process system 600. Accordingly, damage caused by the collision between the dump truck 1 and the object is reduced.

The operation for reducing damage caused by the collision performed by the operator WM includes at least one of the operation of the output operation unit 24 for reducing the output of the power generation device 22, the operation of the brake operation unit 25 for operating the brake device 13, the operation of the retarder operation unit 17 for operating the retarder 28, and the operation of the traveling direction operation unit 15 for changing the traveling direction of the dump truck 1 by the steering device 14. When the output operation unit 24 is operated, the operation signal R1 is generated. The output of the power generation device 22 is reduced based on the operation signal R1 generated by the output operation unit 24. When the brake operation unit 25 is operated, the operation signal R2 is generated. The brake device 13 is operated based on the operation signal R2 generated by the brake operation unit 25, and hence the dump truck 1 is decelerated. When the traveling direction operation unit 15 is operated, the operation signal R3 is generated. The steering device 14 is operated based on the operation signal R3 generated by the traveling direction operation unit 15. When the retarder operation unit 17 is operated, the operation signal R4 is generated. The retarder 28 is operated based on the operation signal R4 generated by the retarder operation unit 17, and hence the dump truck 1 is decelerated.

The power generation device 22 is connected to each of the output control unit 35 and the output operation unit 24. The output operation unit 24 generates the operation signal R1 in response to the operation amount of the operator WM, and supplies the operation signal to the power generation device 22. The power generation device 22 generates an output based on the operation signal R1. The output control unit 35 generates the control signal C1 for controlling the power generation device 22, and supplies the control signal to the power generation device 22. The power generation device 22 generates an output based on the control signal C1.

The retarder 28 is connected to each of the retarder operation unit 17 and the brake control unit 35. The retarder operation unit 17 generates the operation signal R4 in response to the operation of the operator WM, and supplies the operation signal to the retarder 28. The retarder 28 generates a braking force based on the operation signal R4. The brake control unit 35 generates a control signal C4 for controlling the retarder 28, and supplies the control signal to the retarder 28. The retarder 28 generates a braking force based on the control signal C4.

The brake device 13 is connected to each of the brake operation unit 25 and the brake control unit 35. The brake operation unit 25 generates the operation signal R2 in response to the operation amount of the operator WM, and supplies the operation signal to the brake device 13. The brake device 13 generates a braking force based on the operation signal R2. The brake control unit 35 generates the control signal C4 or the control signal C2 for controlling the retarder 28 or the brake device 13, and supplies the control signal to the retarder 28 or the brake device 13. The retarder 28 generates a braking force based on the control signal C4.

The brake device 13 generates a braking force based on the control signal C2. In the description below, a case will be described in which the brake control unit 35 generates only the control signal C4 with respect to the retarder 28 when it is determined that there is a high possibility that the dump truck 1 and the object may collide with each other due to the existence of the object in front of the dump truck 1.

The steering device 14 is connected to each of the traveling direction operation unit 15 and the traveling direction control unit 35. The traveling direction operation unit 15 generates the operation signal R3 in response to the operation amount of the operator WM, and supplies the operation signal to the steering device 14. The steering device 14 changes the direction of the front wheel 6F so that the traveling direction of the traveling device 4 is changed based on the operation signal R3. The traveling direction control unit 35 generates the control signal C3 for controlling the steering device 14, and supplies the control signal to the steering device 14. The steering device 14 changes the direction of the front wheel 6F so that the traveling direction of the traveling device 4 is changed based on the control signal C3.

(Dump Truck Control Method)

Next, an example of a method of controlling the dump truck 1 will be described. In the embodiment, an example of a control method of reducing damage caused by the collision between the dump truck 1 and the object in front of the dump truck 1 will be mainly described. In the description below, the object is assumed as the other dump truck 1F existing in front of the dump truck 1. In the embodiment, an example of a control method of reducing damage caused by the crash between the dump truck 1 and the dump truck 1F in front of the dump truck 1 will be mainly described. In the description below, the dump truck 1F in front of the dump truck 1 is appropriately referred to as the front dump truck 1F.

Figure 8:
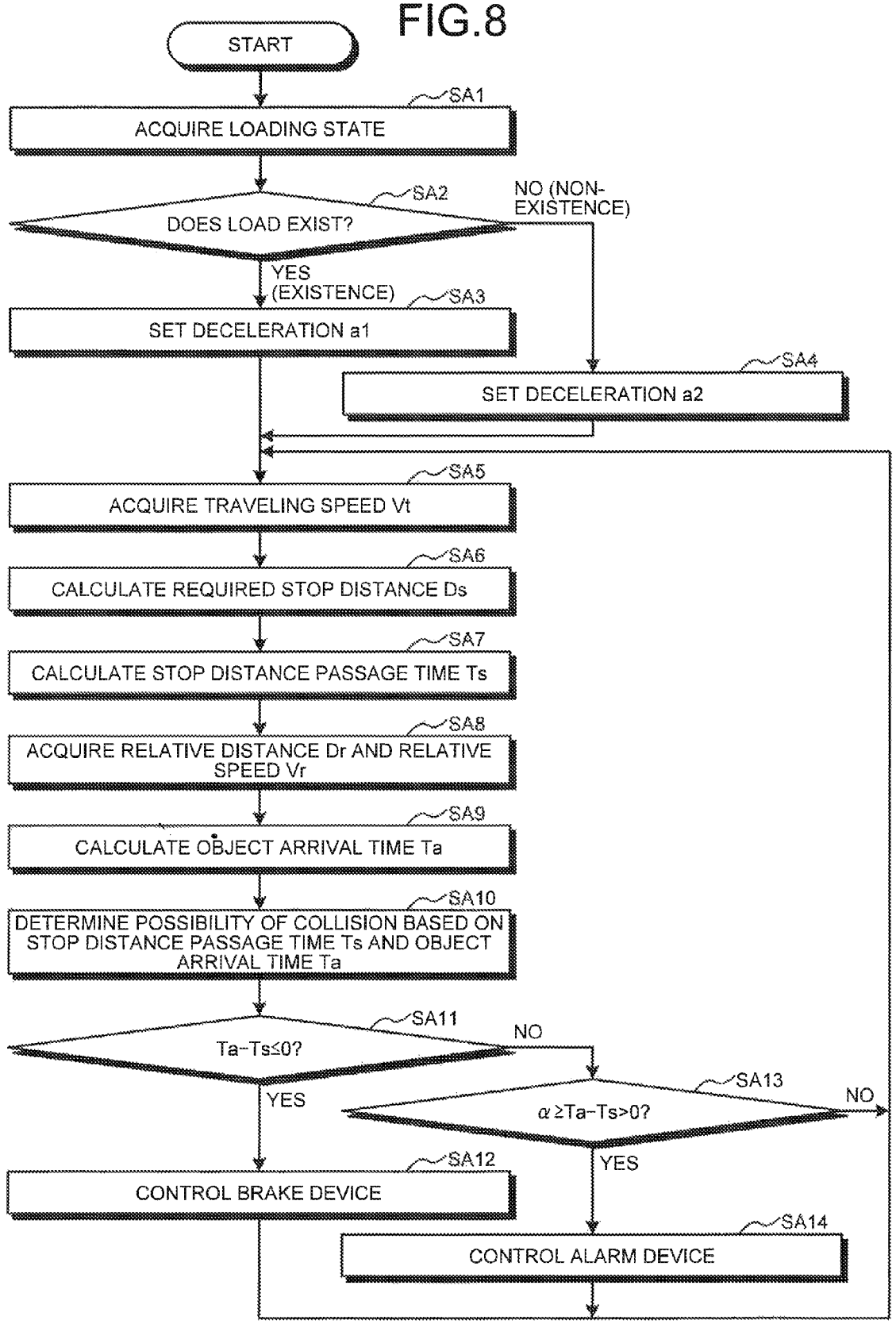
FIG. 8 is a flowchart illustrating an example of a transporter vehicle control method.

FIG. 8 is a flowchart illustrating an example of a method of controlling the dump truck 1 according to the embodiment. The loading state detection device 11 detects the loading state of the load of the vessel 3. The detection result of the loading state detection device 11 is output to the control device 30. The control device 30 acquires the detection result of the loading state detection device 11 (step SA1).

Figure 9:
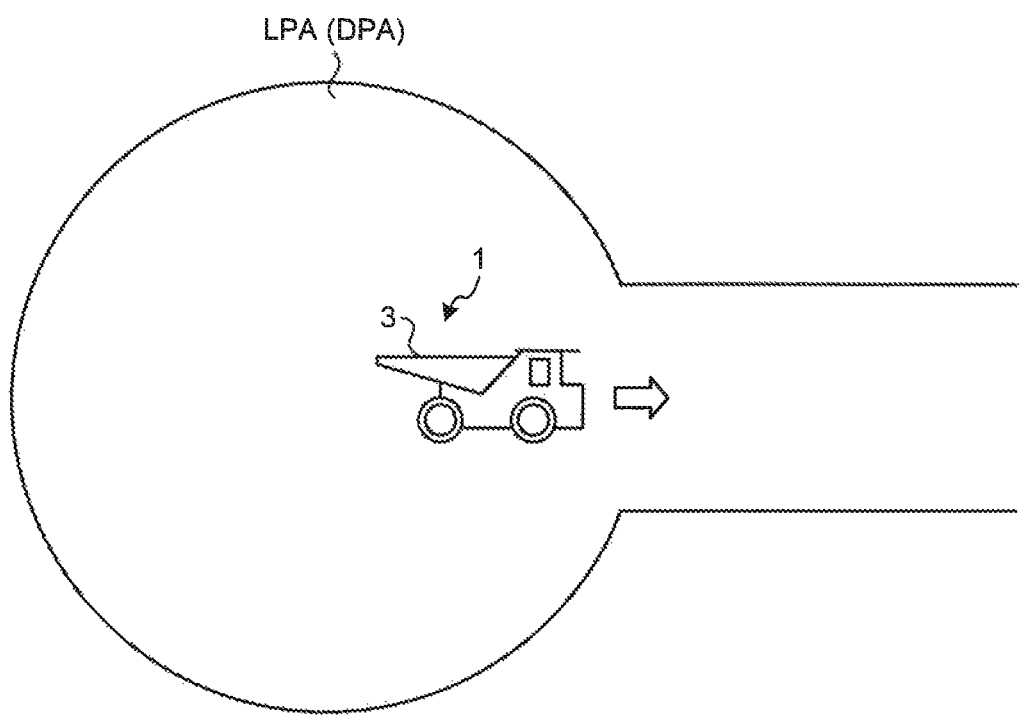
FIG. 9 is a schematic view illustrating an example of the operation of the transporter vehicle.

The timing at which the control device 30 acquires the detection result of the loading state detection device 11 may be a timing at which the dump truck 1 starts to move from the loading field LPA or a timing at which the dump truck 1 starts to move from the soil disposal field DPA. That is, as illustrated in FIG. 9, when a load is loaded on the vessel 3 in the loading field LPA of the mine and the dump truck 1 in a loaded state starts to move from the loading field LPA, the control device 30 may acquire the detection result of the loading state detection device 11. When a load is discharged from the vessel 3 in the soil disposal field DPA of the mine and the dump truck 1 in an empty state starts to move from the soil disposal field DPA, the control device 30 may acquire the detection result of the loading state detection device 11.

Figure 10:
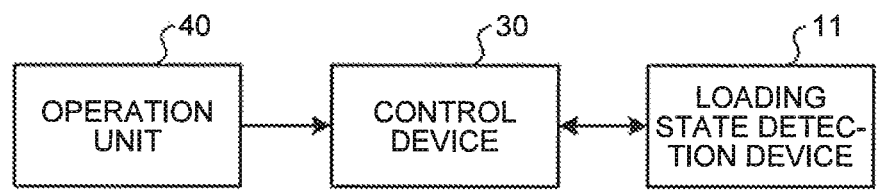
FIG. 10 is a diagram illustrating an example of the control system.

As illustrated in FIG. 10, the timing at which the control device 30 acquires the detection result of the loading state detection device 11 may be determined by the operation of an operation unit 40. The operation unit 40 is disposed near the driver seat 16 inside the cab 8. The operator WM operates the operation unit 40 when the dump truck 1 starts to move from the loading field LPA or the dump truck 1 starts to move from the soil disposal field DPA. When the operation unit 40 is operated, the detection result of the loading state detection device 11 is output to the control device 30. The control device 30 may acquire the detection result of the loading state detection device 11 at the timing at which the operation unit 40 is operated.

After a predetermined time elapses from the timing at which the dump truck 1 starts to move from the loading field LPA or the soil disposal field DPA, the detection result of the loading state detection device 11 may be acquired by the control device 30 and the operation unit 40 may be operated.

An average value of a plurality of detection values of the loading state detection device 11 detected until a predetermined time elapses from the timing at which the dump truck 1 starts to move from the loading field LPA or the soil disposal field DPA may be acquired by the control device 30 as the detection result in the loaded state.

In the embodiment, the loading state of the load of the vessel 3 includes the state whether a load exists in the vessel 3. The control device 30 determines whether a load exists in the vessel 3 (step SA2). The storage unit 34 stores a threshold value for the weight of the load. The control device 30 compares the threshold value with the detection value of the loading state detection device 11. When it is determined that the detection value of the loading state detection device 11 is larger than the threshold value, the control device 30 determines that a load exists in the vessel 3. When it is determined that the detection value of the loading state detection device 11 is equal to or smaller than the threshold value, the control device 30 determines that no load exists in the vessel 3.

Next, the deceleration a of the dump truck 1 (the vehicle 2) is set based on the loading state of the load of the vessel 3 by the variable setting unit 33. The deceleration a of the dump truck 1 is the deceleration (the negative acceleration) of the dump truck 1 when the retarder 28 is operated. In the embodiment, the deceleration a of the dump truck 1 indicates the deceleration of the dump truck 1 when a braking device is operated so that the maximum braking capability of the braking device including the retarder 28 is exhibited. Furthermore, the deceleration a of the dump truck 1 may be a deceleration capable of exhibiting the braking capability in the range where the slip of the dump truck 1 may be suppressed. In general, when the weight of the dump truck 1 is large, the deceleration a is small. When the weight of the dump truck 1 is small, the deceleration a is large. When the deceleration a is small, the traveling dump truck 1 may not easily stop. When the deceleration a is large, the traveling dump truck 1 may easily stop. In the description below, the state where the retarder 28 is operated so that the maximum braking capability of the retarder 28 is exhibited is appropriately referred to as a full brake state.

The weight of the dump truck 1 changes based on the weight of the load loaded on the vessel 3. Accordingly, when the vessel 3 is in an empty state, the weight of the dump truck 1 decreases, and the deceleration a of the dump truck 1 increases (the dump truck 1 may easily stop). When the vessel 3 is in a loaded state, the weight of the dump truck 1 increases, and the deceleration a of the dump truck 1 decreases (the dump truck 1 may not easily stop).

The information on the relation between the weight of the dump truck 1 and the deceleration a of the dump truck 1 of the weight may be obtained in advance by an experiment or a simulation. The storage unit 34 stores the information on the relation between the weight of the load and the deceleration a of the dump truck 1 obtained by an experiment or a simulation.

In the embodiment, the storage unit 34 stores the deceleration a1 of the dump truck 1 in the loaded state and the deceleration a2 of the dump truck 1 in the empty state. The deceleration a2 is larger than the deceleration a1.

When a load is loaded on the vessel 3 in the mining site of the mine, a load may be loaded on the vessel 3 so that the maximum loading capability of the vessel 3 is exhibited from the viewpoint of the improvement in productivity of the mining site. That is, a load of the amount corresponding to 100% of the capacity volume of the vessel 3 is loaded on the vessel 3. For example, the operation in which a load of the amount corresponding to 70% of the capacity volume of the vessel 3 is loaded on the vessel 3 has poor production efficiency and is unusual. That is, in the embodiment, the loaded state of the vessel 3 indicates a state where a load is fully loaded on the vessel 3. For that reason, the deceleration a of the dump truck 1 is sufficient as two values, that is, a deceleration a1 corresponding to the dump truck 1 in the loaded state (the full state) and a deceleration a2 corresponding to the dump truck 1 in the empty state.

In step SA2, when it is determined that a load exists, the variable setting unit 33 sets the deceleration a1 (step SA3). In step SA2, when it is determined that a load does not exist, the variable setting unit 33 sets the deceleration a2 (step SA4).

The traveling state detection device 10 detects the traveling state of the dump truck 1. The detection result of the traveling state detection device 10 is output to the control device 30. The control device 30 acquires the detection result of the traveling state detection device 10.

The traveling speed detection device 10A of the traveling state detection device 10 detects the traveling speed Vt of the dump truck 1, and outputs the detection result to the control device 30. The control device 30 acquires the detection result of the traveling speed detection device 10A (step SA5).

The detection result of the traveling direction detection device 10B and the detection result of the advancing direction detection device 10C are also output to the control device 30. The control device 30 acquires the detection result of the traveling direction detection device 10B and the detection result of the advancing direction detection device 10C.

The detection cycle of the traveling state detection device 10 is Gt (for example, a cycle equal to or longer than 1 ms and equal to or shorter than 100 ms). The traveling state detection device 10 continuously outputs the detection result to the control device 30 at a predetermined time interval (the detection cycle) Gt. The control device 30 acquires the detection result. The control device 30 normally monitors the detection result of the traveling state detection device 10 during the operation of the dump truck 1.

The time information used in the determination of the possibility of collision with the object is calculated based on the detection result of the traveling state detection device 10 by the calculation unit 32. The calculation unit 32 calculates the required stop distance Ds (step SA6). Further, the calculation unit 32 calculates the stop distance passage time Ts based on the traveling speed Vt and the required stop distance Ds (step SA7).

Figure 11:
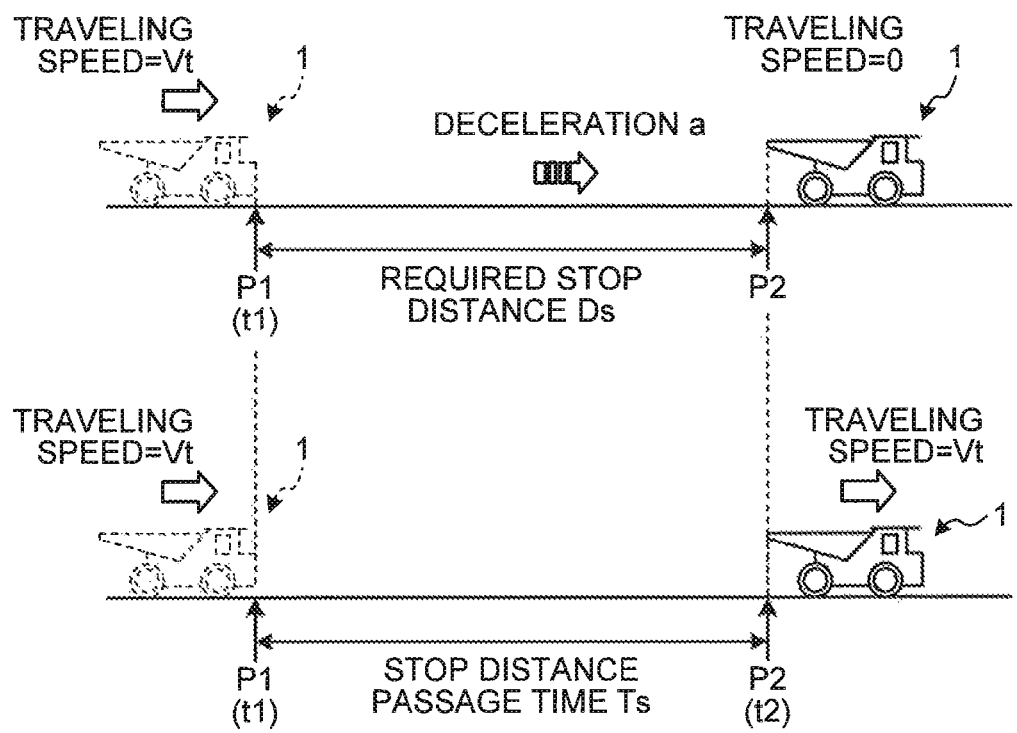
FIG. 11 is a schematic view illustrating an example of the operation of the transporter vehicle.

FIG. 11 is a view illustrating the required stop distance Ds and the stop distance passage time Ts. The required stop distance Ds will be described. As illustrated in FIG. 11, in the case where the traveling speed of the dump truck 1 at a first point P1 detected by the traveling state detection device 10 is Vt and the deceleration set by the variable setting unit 33 is a, the dump truck 1 stops at a second point P2 in front of the first point P1 when the retarder 28 is operated in a full brake state when the dump truck 1 is located at the first point P1. At the second point P2, the traveling speed is, of course, 0. The required stop distance Ds is a distance between the first point P1 where the retarder 28 is operated in the full brake state and the second point P2 where the dump truck 1 stops. When the traveling speed of the dump truck 1 at the first point P1 detected by the traveling state detection device 10 is Vt and the deceleration set by the variable setting unit 33 is a, the required stop distance Ds is obtained based on the following equation (1).

$$Ds = Vt(Vt/a) - (1/2)a(Vt/a)^2 \tag{1}$$
$$= (1/2a)Vt^2$$

Accordingly, when the deceleration a1 is set, the following equation is obtained.

$$Ds=(1/2a1)Vt^2 \tag{1A}$$

When the deceleration a2 is set, the following equation is obtained.

$$Ds=(1/2a2)Vt^2 \tag{1B}$$

In this way, in the embodiment, the required stop distance Ds between the first point P1 and the second point P2 where the dump truck 1 may be stopped is calculated based on the deceleration a set by the variable setting unit 33 and the traveling speed Vt of the dump truck 1 (the vehicle 2) at the first point P1 detected by the traveling state detection device 10.

Next, the stop distance passage time Ts will be described. The stop distance passage time Ts indicates the time from the first time point t1 at which the dump truck 1 exists at the first point P1 to the second time point t2 at which the dump truck reaches the second point P2 when the dump truck travels by the required stop distance Ds at the traveling speed Vt. That is, the stop distance passage time Ts indicates the time necessary for the dump truck 1 to travel by the required stop distance Ds when the dump truck travels by the required stop distance Ds at the constant traveling speed Vt without the operation of the brake device 13 in the state where the dump truck travels at the traveling speed Vt in the first point P1 (the first time point t1). The stop distance passage time Ts is obtained based on the following equation (2).

$$Ts=Ds/Vt \tag{2}$$

With the above-described configuration, the required stop distance Ds and the stop distance passage time Ts are respectively calculated.

The object detection device 12 detects, for example, the front dump truck 1F. The detection result of the object detection device 12 is output to the control device 30. The control device 30 acquires the detection result of the object detection device 12.

The object detection device 12 includes a radar device, and may detect the front dump truck 1F. The object detection device 12 may detect the relative distance Dr and the relative speed Vr of the front dump truck 1F and the dump truck 1 provided with the object detection device 12. The object detection device 12 detects the relative distance Dr and the relative speed Vr with respect to the front dump truck 1F, and outputs the detection result to the control device 30. The control device 30 acquires the relative distance Dr and the relative speed Vr with respect to the front dump truck 1F (step SA8).

The detection cycle of the object detection device 12 is different from the detection cycle Gt of the traveling state detection device 10. The object detection device 12 continuously outputs the detection result to the control device 30 at a predetermined time interval. The control device 30 acquires the detection result. The control device 30 monitors the detection result of the object detection device 12 at all times during the operation of the dump truck 1.

The calculation unit 32 calculates the time information used in the determination of the possibility of collision based on the detection result of the object detection device 12. The calculation unit 32 calculates the object arrival time Ta until the dump truck 1 arrives at the front dump truck 1F (step SA9).

Figure 12:
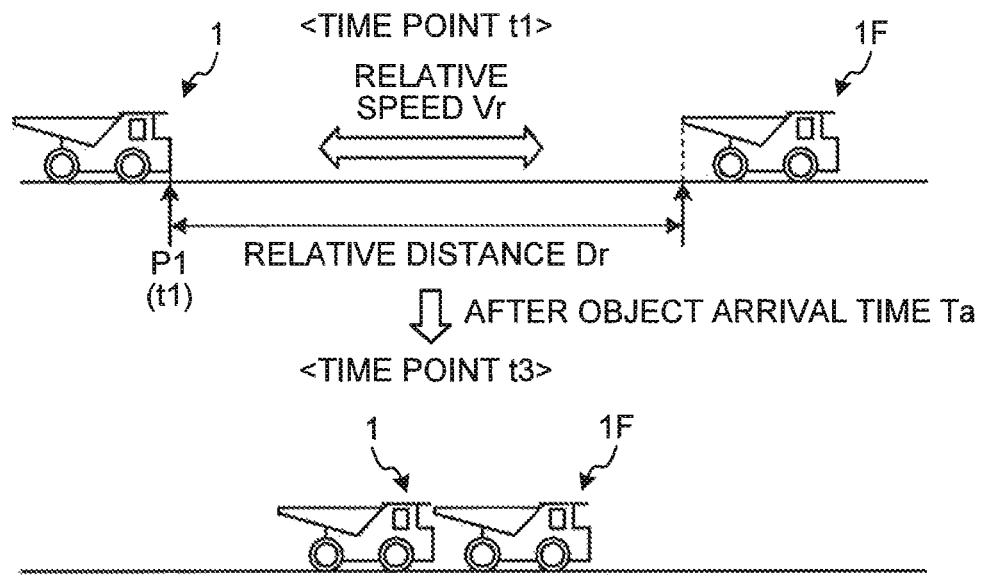
FIG. 12 is a schematic view illustrating an example of the operation of the transporter vehicle.

FIG. 12 is a view illustrating the object arrival time Ta. The object arrival time Ta indicates the time taken to the third time point t3 at which the dump truck 1 arrives at the front dump truck 1F when the dump truck travels by the relative distance Dr at the relative speed Vr from the first time point t1 based on the relative distance Dr and the relative speed Vr of the dump truck 1 and the front dump truck 1F at the first point P1 (the first time point t1) detected by the object detection device 12 of the dump truck 1 when the dump truck 1 exists at the first point P1. That is, when the time point at which the relative distance Dr and the relative speed Vr are detected is set as the first time point t1 and the time point at which the dump truck 1 arrives at the front dump truck 1F when the dump truck travels by the relative distance Dr detected at the first time point t1 at the relative speed Vr is set as the third time point t3, the object arrival time Ta indicates the time from the first time point t1 to the third time point t3. The object arrival time Ta is obtained by the following equation (3).

$$Ta = Dr/Vr \quad (3)$$

In this way, the object arrival time Ta taken until the third time point t3 at which the dump truck 1 arrives at the front dump truck 1F when the dump truck travels by the relative distance Dr at the relative speed Vr from the first time point t1 is calculated based on the relative distance Dr and the relative speed Vr of the dump truck 1 and the front dump truck 1F at the first time point t1 detected by the object detection device 12.

The control device 30 continuously calculates the stop distance passage time Ts and the object arrival time Ta at each of a plurality of points (each of time points) by monitoring the detection value of the traveling state detection device 10 and the detection value of the object detection device 12 at all times. In other words, the control device 30 continuously outputs the stop distance passage time Ts and the object arrival time Ta at each of a plurality of points (each of time points) at a predetermined time interval Gt at all times.

The collision determination unit 31 determines the possibility of the collision between the dump truck 1 and the front dump truck 1F based on the stop distance passage time Ts and the object arrival time Ta (step SA10).

The collision determination unit 31 compares the stop distance passage time Ts with the object arrival time Ta and determines the possibility of the collision based on the comparison result. In the embodiment, the collision determination unit 31 performs the calculation of "Ta−Ts". Based on the result of the calculation of "Ta−Ts", it is estimated whether the dump truck 1 and the front dump truck 1F collide with each other from the first time point t1. The calculation of "Ta−Ts" is performed at a predetermined time interval Gt.

When the calculation result satisfies the relation of "Ta−Ts≤0" (step SA11, Yes), the time taken for the collision between the dump truck 1 and the front dump truck 1F, that is, the object arrival time Ta is estimated as the time equal to the stop distance passage time Ts or the time shorter than the stop distance passage time Ts. In this case, the collision determination unit 31 determines that the possibility of the collision is Level 1 in which the possibility of the collision between the dump truck 1 and the front dump truck 1F is the highest.

When the calculation result satisfies the relation of "α≥Ta−Ts>0" (step SA13, Yes), the time taken for the collision between the dump truck 1 and the front dump truck 1F, that is, the object arrival time Ta is estimated as the time slightly longer than the stop distance passage time Ts. In this case, the collision determination unit 31 determines that the possibility of the collision is Level 2 in which the possibility of the collision between the dump truck 1 and the front dump truck 1F is lower than that of Level 1. The numerical value α is a positive value which is set in advance.

When the calculation result satisfies the relation of "Ta−Ts>α" (step SA13, No), the time taken for the collision between the dump truck 1 and the front dump truck 1F, that is, the object arrival time Ta is estimated as the time sufficiently longer than the stop distance passage time Ts. In this case, the collision determination unit 31 determines that the possibility of the collision is Level 3 in which the possibility of the collision between the dump truck 1 and the front dump truck 1F is the lowest.

In this way, it is estimated whether the dump truck 1 and the front dump truck 1F collide with each other based on the result of the calculation "Ta−Ts", and the possibility of the collision is determined based on the estimation result. Further, the possibility of the collision (the risk) is classified into a plurality of levels based on the estimation result. In the embodiment, the possibility of the collision is classified into Level 1, Level 2, and Level 3. Among Level 1, Level 2, and Level 3, Level 1 is the level in which the possibility of the collision is the highest, Level 2 is the level in which the possibility of the collision is lower than that of Level 1, and Level 3 is the level in which the possibility of the collision is the lowest.

The collision determination unit 31 determines whether the result of the calculation "Ta−Ts" is Level 1 (Ta−Ts≤0) (step SA11).

In step SA11, when it is determined that the result is Level 1 (step SA11, Yes), the control device 30 controls the retarder 28 (step SA12). The control unit 35 outputs the control signal C4 to the retarder 28. The control unit 35 outputs the control signal C4 to the retarder 28 so that the retarder 28 is operated in the full brake state.

The brake process of the retarder 28 is performed based on the control signal C4 supplied from the control unit 35. Accordingly, the traveling speed of the dump truck 1 is decreased or the dump truck 1 is stopped. Thus, a damage caused by the collision between the dump truck 1 and the front dump truck 1F is reduced.

At Level 1, the control signal C4 takes priority over the operation signal R2. When the control signal C4 is output from the control unit 35 to the retarder 28, the brake process of the retarder 28 is performed based on the control signal C4 regardless of the state whether the brake operation unit 25 is operated and the state whether the operation amount of the brake operation unit 25 is large or small.

In step SA11, when it is determined that the result is Level 1, the control unit 35 may output the control signal C1 to the power generation device 22 so that the output of the power generation device 22 is reduced. The output reduction process of the power generation device 22 is performed based on the control signal C1 supplied from the control unit 35. Accordingly, the traveling speed of the dump truck 1 is decreased. Thus, a damage caused by the collision between the dump truck 1 and the front dump truck 1F is reduced.

In this case, the control signal C1 takes priority over the operation signal R1 at Level 1. When the control signal C1 is output from the control unit 35 to the power generation device 22, the output reduction process of the power generation device 22 is performed based on the control signal C1 regardless of the state whether the output operation unit 24 is operated and the state whether the operation amount of the output operation unit 24 is large or small.

In step SA11, when it is determined that the possibility of the collision is Level 1, the control unit 35 may output the control signal C4 to the retarder 28 and may output the control signal C1 to the power generation device 22. That is, the output reduction process of the power generation device 22 may be performed along with the brake process of the retarder 28.

In step SA11, when it is determined that the result of the calculation "Ta−Ts" is not Level 1 (Ta−Ts≤0) (step SA11, No), the collision determination unit 31 determines whether the result of the calculation "Ta−Ts" is Level 2 ($\alpha \geq$ Ta−Ts>0) (step SA13).

In step SA13, when it is determined that the result is Level 2 (step SA13, Yes), the control device 30 controls the alarm device 21 (step SA14). The control unit 35 outputs the control signal C6 to the alarm device 12. The control unit 35 outputs the control signal C6 to the alarm device 21 so that the alarm device 21 generates an alarm.

Based on the control signal C6 supplied from the control unit 35, the alarm generation process of the alarm device 21 is performed. The alarm device 21 refreshes the attention of the operator WM by generating a sound or light. Thus, an operation for reducing damage caused by the collision is performed by the operator WM. Accordingly, damage caused by the collision between the dump truck 1 and the front dump truck 1F is reduced.

In step SA13, when it is determined that the result is Level 2, the control unit 35 may output the control signal C5 to the display device 20. Based on the control signal C5 supplied from the control unit 35, the display process of the display device 20 is performed. Thus, an operation for reducing damage caused by the collision is performed by the operator WM.

In step SA13, when it is determined that the result is Level 2, the control unit 35 may output the control signal C2 so that the brake device 13 is operated. For example, the brake process of the brake device 13 may be performed so that a braking force smaller than the braking force in the full brake state is generated based on the control signal C2 supplied from the control unit 35. Alternatively, in step SA13, when it is determined that the result is Level 2, the control unit 35 outputs the control signal C4 so that the retarder 28 is operated, but the brake process of the retarder 28 may be performed so that a braking force smaller than the braking force in the full brake state is generated.

In step SA13, when it is determined that the result is Level 2, the control unit 35 may output the control signal C1 so that the output of the power generation device 22 is reduced. Based on the control signal C1 supplied from the control unit 35, the output reduction process of the power generation device 22 is performed.

In step SA13, when it is determined that the result of the calculation "Ta−Ts" is not Level 2 ($\alpha \geq$ Ta−Ts>0) (step SA13, No), the collision determination unit 31 determines that the result of the calculation "Ta−Ts" is Level 3 (Ta−Ts>$\alpha$).

When it is determined that the result is Level 3, a process for reducing damage caused by the collision is not performed by the process system 600. The control system 300 returns the routine to step SA5, and repeats the above-described series of processes. For example, the control device 30 continuously monitors the detection result of the traveling state detection device 10 and the detection result of the object detection device 12 at all times.

In step SA12, when the retarder 28 is controlled and that the traveling speed Vt of the dump truck 1 is decreased so that the possibility of collision is decreased, the output of the control signal C4 from the control unit 35 to the retarder 28 is stopped. Thus, the control of the retarder 28 by the control device 30 is not performed. The control system 300 returns the routine to step SA5, and repeats the above-described series of processes.

In step SA14, when the alarm device 21 is controlled and the traveling speed Vt of the dump truck 1 is decreased by, for example, any one of the operations of the brake operation unit 25, the retarder operation unit 17, and the output operation unit 24 by the operator WM so that the possibility of collision is decreased, the output of the control signal C6 from the control unit 35 to the alarm device 21 is stopped. Thus, the control of the alarm device 21 by the control device 30 is not performed. The control system 300 returns the routine to step SA5, and repeats the above-described series of processes.

In at least one of step SA11 and step SA13, when it is determined that the possibility of collision is Level 1 or Level 2, the control unit 35 may output the control signal C3 to the steering device 14 in order to reduce damage caused by the collision between the dump truck 1 and the front dump truck 1F. When the front dump truck 1F exists on the traveling road of the dump truck 1, the traveling direction of the dump truck 1 may be changed by performing the traveling direction change process of the steering device 14 so that the front dump truck 1F is not disposed on the traveling road of the dump truck 1.

At Level 1, the control signal C3 may take priority over the operation signal R3. When the control signal C3 is output from the control unit 35 to the steering device 14, the steering device 14 performs the traveling direction change process based on the control signal C3 regardless of the state whether the traveling direction operation unit 15 is operated and the state whether the operation amount of the traveling direction operation unit 15 is large or small.

In the embodiment, in step SA5, not only the detection result of the traveling speed detection device 10A, but also the detection result of the traveling direction detection device 10B and the detection result of the advancing direction detection device 10C are also output to the control device 30. For example, when it is determined that the traveling direction of the dump truck 1 changes so that the front dump truck 1F is deviated from the traveling road of the dump truck 1 based on the detection result of the traveling direction detection device 10B even when the object detection device 12 detects the front dump truck 1F, the control device 30 may determine that the possibility of collision is low (Level 3). In that case, a process for reducing damage caused by the collision may not be performed by the process system 600.

When the dump truck 1 moves backward, there is a low possibility that the dump truck 1 and the front dump truck 1F may collide with each other. For that reason, when it is determined that the dump truck 1 moves backward based on the detection result of the advancing direction detection device 10C, a process for reducing damage caused by the collision may not be performed by the process system 600.

In the embodiment, when it is determined that the possibility of collision is Level 2, the operation signal R1 may take priority over the control signal C1. For example, when both the operation signal R1 and the control signal C1 are supplied to the power generation device 22, the power generation device 22 may be driven based on the operation signal R1. Further, when it is determined that the possibility of collision is Level 2, the operation signal R2 may take priority over the control signal C2. For example, when both the operation signal R2 and the control signal C2 are supplied to the brake device 13, the brake device 13 may be driven based on the operation signal R2. Further, when it is determined that the possibility of collision is Level 2, the operation signal R3 may take priority over the control signal C3. For example, when both the operation signal R3 and the control signal C3 are supplied to the steering device 14, the steering device 14 may be driven based on the operation signal R3.

(Action)

As described above, according to the embodiment, since the possibility of the collision (the crash) between the dump truck 1 and the front dump truck 1F is determined in consideration of the loading state of the load of the vessel 3, it is possible to suppress degradation in the production efficiency of the mine or degradation in the work efficiency of the dump truck 1 while reducing damage caused by the collision with the front dump truck 1F. The dump truck 1 in the empty state has a weight slightly lighter than the dump truck 1 in the loaded state, and has a high traveling performance. The traveling performance of the dump truck 1 includes at least one of the driving performance, the braking performance, and the turning performance. The dump truck 1 in the empty state having a high traveling performance may sufficiently perform a process for reducing damage caused by the collision with the object by the process system 600 compared to the dump truck 1 in the loaded state having a low traveling performance. When the traveling operation of the dump truck 1 in the empty state having a high traveling performance is limited based on the dump truck 1 in the empty state having a low traveling performance in order to reduce damage caused by the collision, the traveling operation of the dump truck 1 in the empty state is excessively limited. As a result, there is a possibility that the work efficiency of the dump truck 1 may be degraded. For example, when the traveling operation is excessively limited, the traveling speed is decreased or the traveling operation is stopped in the dump truck 1 in the empty state although there is no need to decrease the traveling speed or stop the traveling operation. According to the embodiment, since the possibility of the collision (the crash) with the front dump truck 1F is determined in consideration of the loading state of the load of the vessel 3 having a large influence on the traveling performance of the dump truck 1, it is possible to suppress a problem in which the traveling operation of the dump truck 1 in the empty state is excessively limited while damage caused by the collision is reduced. Further, since the traveling operation of the dump truck 1 in the loaded state is appropriately limited, damage caused by the collision is reduced. Accordingly, even when the loading state of the load of the vessel 3 changes, the dump truck 1 may be operated with high work efficiency while reducing damage caused by the collision.

In the embodiment, the deceleration a of the dump truck 1 is obtained as the variable changed based on the loading state of the load of the vessel 3, the time until the dump truck 1 and the front dump truck 1F collide with each other is estimated based on the deceleration a, and the possibility of collision is determined. In the embodiment, the collision determination unit 31 estimates the time until the dump truck 1 collides with the front dump truck 1F based on the stop distance passage time Ts and the object arrival time Ta. The stop distance passage time Ts is obtained based on the deceleration a of the dump truck 1 set by the variable setting unit 33 and the traveling speed Vt of the dump truck 1 detected by the traveling state detection device 10. The object arrival time Ta is obtained based on the detection result of the object detection device 12. The collision determination unit 31 may estimate whether the collision with the front dump truck 1F occurs based on the deceleration a set by the variable setting unit 33, the detection result of the traveling state detection device 10, and the detection result of the object detection device 12. Thus, the possibility of collision may be reliably determined.

According to the embodiment, since the stop distance passage time Ts and the object arrival time Ta are calculated and the possibility of collision is determined based on the stop distance passage time Ts and the object arrival time Ta, the possibility of collision may be reliably determined.

According to the embodiment, the dump truck 1 includes the process system 600 capable of performing a process for reducing damage caused by the collision, and the control signal C for reducing damage caused by the collision is output from the control unit 35 to the process system 600 based on the determination result of the collision determination unit 31. Accordingly, damage caused by the collision between the dump truck 1 and the front dump truck 1F may be reduced.

In the embodiment, the process system 600 includes a plurality of process devices capable of performing different processes. For that reason, the control unit 35 may output the control signal C to an appropriate (specific) process device capable of reducing damage caused by the collision and suppressing degradation in the work efficiency among the plurality of process devices based on the determination result of the collision determination unit 31.

In the embodiment, the determination of the possibility of collision of the collision determination unit 31 includes the classification of the possibility of collision into a plurality of levels. The control unit 35 outputs the control signal C to a specific process device among the plurality of devices based on the level. In the embodiment, since the control signal C2 is output to the brake device 13 at Level 1 in which the possibility of collision (the risk) is high, the collision may be prevented. Since the control signal C6 is output to the alarm device 21 at Level 2 in which the possibility of collision is comparatively low, degradation in the work efficiency may be suppressed. In this way, when an optimal process device is selected among the plurality of process devices based on the levels of the possibility of collision and a process for reducing damage caused by the collision is performed by using the selected process device, damage caused by the collision may be reduced, and degradation in the work efficiency may be suppressed.

In the embodiment, the loading state of the load of the vessel 3 includes the state whether the load of the vessel 3 exists. As described above, the dump truck 1 is operated so that the vessel 3 enters at least one of the full state and the empty state in the mining site of the mine. For that reason, the control device 30 may determine the loading state of the load of the vessel 3 by comparing the detection value of the loading state detection device 11 with the threshold value.

Thus, the deceleration a may be set by a simple method, and hence the possibility of collision may be reliably determined.

Second Embodiment

A second embodiment will be described. In the description below, the same reference numerals will be given to the same or identical components to the above-described embodiment, and the description thereof will be simplified or omitted.

Figure 13:
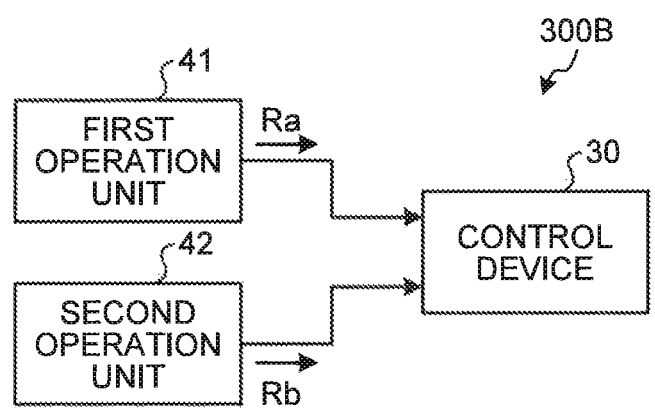
FIG. 13 is a diagram illustrating an example of the control system.

FIG. 13 is a schematic view illustrating an example of a control system 300B according to the embodiment. The control system 300B includes a first operation unit 41 which is disposed inside the cab 8 and a second operation unit 42 which is disposed inside the cab 8. The first operation unit 41 and the second operation unit 42 are operated by the operator WM. An operation signal Ra which is generated by the operation of the first operation unit 41 is output to the control device 30. An operation signal Rb which is generated by the operation of the second operation unit 42 is output to the control device 30.

As described above by referring to FIG. 1, a load is loaded on the vessel 3 in the loading field LPA of the mine. The dump truck 1 in the loaded state travels from the loading field LPA to the soil disposal field DPA of the mine, and discharges the load at the soil disposal field DPA.

The deceleration a1 is set while the dump truck 1 in the loaded state travels after a load is loaded on the dump truck in the loading field LPA. The deceleration a2 is set while the dump truck 1 in the empty state travels after the load is discharged from the dump truck in the soil disposal field DPA. The deceleration a2 is larger than the deceleration a1.

The information on the loading state of the load of the vessel 3 is output to the control device 30 by the operation of the first operation unit 41 and the second operation unit 42 by the operator WM. When a load is loaded on the vessel 3, the first operation unit 41 is operated by the operator WM. When the vessel 3 is empty, the second operation unit 42 is operated by the operator WM. The deceleration a1 is set by the operation of the first operation unit 41. The deceleration a2 is set by the operation of the second operation unit 42.

After a load is loaded on the vessel 3 in the loading field LPA, the first operation unit 41 is operated by the operator WM. Thus, the operation signal Ra is output to the control device 30. The variable setting unit 33 sets the deceleration a1 based on the operation signal Ra. While the dump truck 1 in the loaded state travels, the stop distance passage time Ts is set based on the deceleration a1, and the same process as the first embodiment is performed.

After a load is discharged from the vessel 3 in the soil disposal field DPA, the second operation unit 42 is operated by the operator WM. Thus, the operation signal Rb is output to the control device 30. The variable setting unit 33 sets the deceleration a2 based on the operation signal Rb. While the dump truck 1 in the empty state travels, the stop distance passage time Ts is set based on the deceleration a2, and the same process as the first embodiment is performed.

As described above, the deceleration a1 and the deceleration a2 may be set by the operation of the first operation unit 41 and the second operation unit 42. As described above, the dump truck 1 is operated so that the vessel 3 enters at least one of the full state and the empty state in the mining site of the mine. The weight of the load in the full state and the weight (for example, 0) in the empty state may be measured in advance, and may be stored as given information in the storage unit 34. The deceleration a1 of the dump truck 1 set in response to the weight of the load in the full state and the deceleration a2 of the dump truck 1 set in response to the empty state are also measured in advance, and may be stored as given information in the storage unit 34. Accordingly, when the first operation unit 41 is operated in the full state, the variable setting unit 33 may set the deceleration a1 in response to the full state by extracting the deceleration from the storage unit 34. When the second operation unit 42 is operated in the empty state, the variable setting unit 32 may set the deceleration a2 in response to the empty state by extracting the deceleration from the storage unit 34.

According to the embodiment, the loading state detection device 11 may not be provided.

Third Embodiment

A third embodiment will be described. In the description below, the same reference numerals will be given to the same or identical components to the above-described embodiment, and the description thereof will be simplified or omitted.

Figure 14:
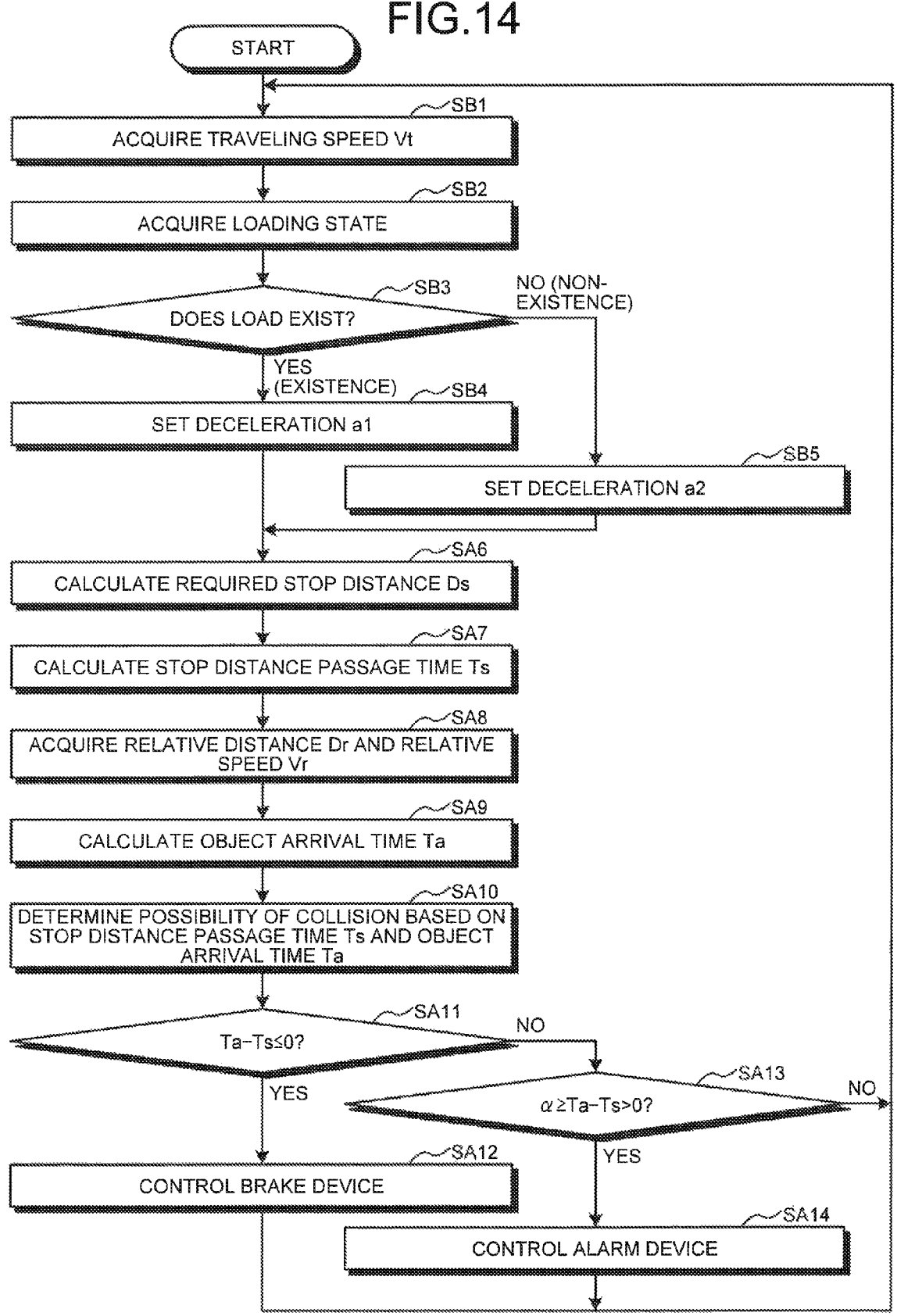
FIG. 14 is a flowchart illustrating an example of the transporter vehicle control method.

FIG. 14 is a flowchart illustrating an example of a method of controlling the dump truck 1 according to the embodiment. The detection result of the traveling state detection device 10 is output to the control device 30, and the information on the traveling speed Vt of the dump truck 1 is acquired by the control device 30 (step SB1).

Similarly to the above-described embodiment, the detection cycle of the traveling state detection device 10 is Gt (for example, a cycle equal to or longer than 1 ms and equal to or shorter than 100 ms). The traveling state detection device 10 continuously outputs the detection result to the control device 30 at a predetermined time interval Gt. The control device 30 acquires the detection result. The control device 30 normally monitors the detection result of the traveling state detection device 10 during the operation of the dump truck 1.

The detection result of the loading state detection device 11 is output to the control device 30, and the information on the loading state of the dump truck 1 is acquired by the control device 30 (step SB2).

The detection cycle of the loading state detection device 11 is Gt. The detection cycle Gt of the traveling state detection device 10 is equal to the detection cycle Gt of the loading state detection device 11. The control device 30 acquires the detection result of the loading state detection device 11. The control device 30 monitors the detection result of the loading state detection device 11 at all times during the operation of the dump truck 1.

The control device 30 determines whether a load exists in the vessel 3 based on the detection result of the loading state detection device 11 (step SB3). When it is determined that the detection value of the loading state detection device 11 is larger than the threshold value, the control device 30 determines that a load exists in the vessel 3. When it is determined that the detection value of the loading state detection device 11 is equal to or smaller than the threshold value, the control device 30 determines that a load does not exist in the vessel 3.

In step SB3, when it is determined that a load exists, the deceleration a1 is set (step SB4). In step SB3, when it is determined that a load does not exist, the deceleration a2 is set (step SB5).

Hereinafter, the processes of step SA6 to step SA14 are performed according to the above-described embodiment. The routine returns to step SB1 in the case where it is determined that the result is Level 3 in step SA13, the case where the process of step SA12 ends, and the case where the process of step SA14 ends.

As described above, the loading state of the load of the vessel 3 may be monitored by the loading state detection device 11 at all times during the operation of the dump truck 1.

Fourth Embodiment

A fourth embodiment will be described. In the description below, the same reference numerals will be given to the same or identical components to the above-described embodiment, and the description thereof will be simplified or omitted.

In the above-described embodiment, an example has been described in which at least one deceleration is selected from the deceleration a1 and the deceleration a2 based on the state whether a load exists in the vessel 3. In the embodiment, an example will be described in which the weight of the load is detected and the deceleration a is set based on the weight of the load.

Figure 15:
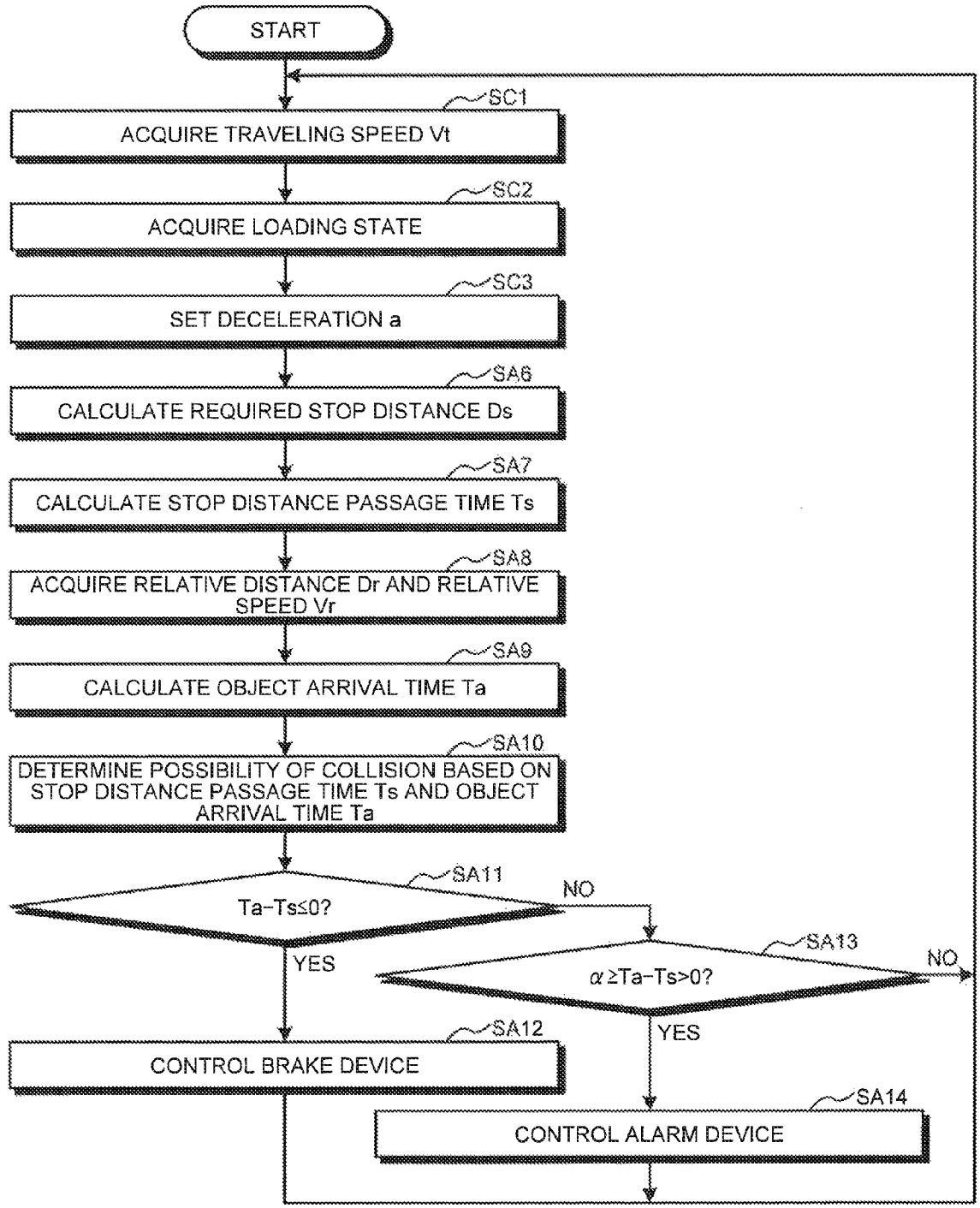
FIG. 15 is a flowchart illustrating an example of the transporter vehicle control method.

FIG. 15 is a flowchart illustrating an example of a method of controlling the dump truck 1 according to the embodiment. The detection result of the traveling state detection device 10 is output to the control device 30, and the information on the traveling speed Vt of the dump truck 1 is acquired by the control device 30 (step SC1).

Similarly to the above-described embodiment, the traveling state detection device 10 detects the traveling state of the dump truck 1 at the detection cycle Gt, and outputs the detection result to the control device 30. The control device 30 acquires the detection result. The control device 30 monitors the detection result of the traveling state detection device 10 at all times during the operation of the dump truck 1.

The detection result of the loading state detection device 11 is output to the control device 30, and the information on the loading state of the dump truck 1 is acquired by the control device 30 (step SC2).

The detection cycle Gt of the traveling state detection device 10 is equal to the detection cycle Gt of the loading state detection device 11. The control device 30 acquires the detection result of the loading state detection device 11. The control device 30 monitors the detection result of the loading state detection device 11 at all times during the operation period of the dump truck 1.

The control device 30 sets the deceleration a based on the detection result of the loading state detection device 11 (step SC3). The deceleration a is set based on the weight of the load.

Figure 16:
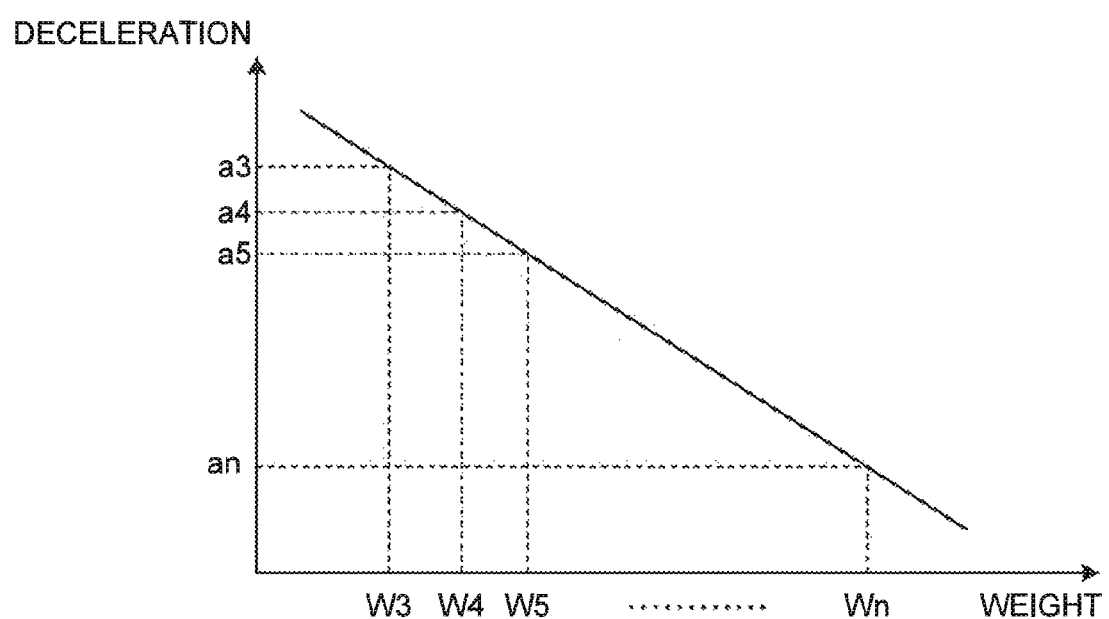
FIG. 16 is a diagram illustrating an example of a relation between the weight of a load and a deceleration.

FIG. 16 is a schematic view illustrating an example of a relation between the weight of the load and the deceleration a of the dump truck 1 involving with the weight. As illustrated in FIG. 16, when the weight of the dump truck 1 including a load increases, the deceleration a decreases. When the weight of the dump truck 1 including a load decreases, the deceleration a increases.

The information (the table information) indicating the relation between the weight of the load and the deceleration a illustrated in FIG. 16 is stored in the storage unit 34. The information may be obtained by an experiment or a simulation in advance.

The control device 30 obtains the deceleration a corresponding to the weight of the load based on the weight of the load detected by the loading state detection device 11 and the information stored in the storage unit 34. For example, when the weight of the load is W3, the deceleration a3 is set. When the weight of the load is W4, the deceleration a4 is set. When the weight of the load is W5, the deceleration a5 is set. When the weight of the load is Wn, the deceleration an is set.

The deceleration a may be obtained at the same cycle as the detection cycle Gt of the traveling state detection device 10, the detection cycle Gt of the loading state detection device 11, or the detection cycle Gt of the object detection device 12. The control device 30 continuously updates the deceleration a based on the detection value of the loading state detection device 11 during the operation of the dump truck 1.

After the deceleration a is set, the processes of step SA6 to step SA14 are performed according to the above-described embodiment. The control device 30 determines the possibility of collision based on the recent deceleration a in the updated deceleration a. The routine returns to step SC1 in the case where it is determined that the result is Level 3 in step SA13, the case where the process of step SA12 ends, and the case where the process of step SA14 ends.

As described above, the table information indicating the relation between the weight of the load and the deceleration a is prepared in advance, and the deceleration a may be set based on the table information by referring to the detection result when the weight of the load is detected.

Fifth Embodiment

A fifth embodiment will be described. In the description below, the same reference numerals will be given to the same or identical components to the above-described embodiment, and the description thereof will be simplified or omitted.

Figure 17:
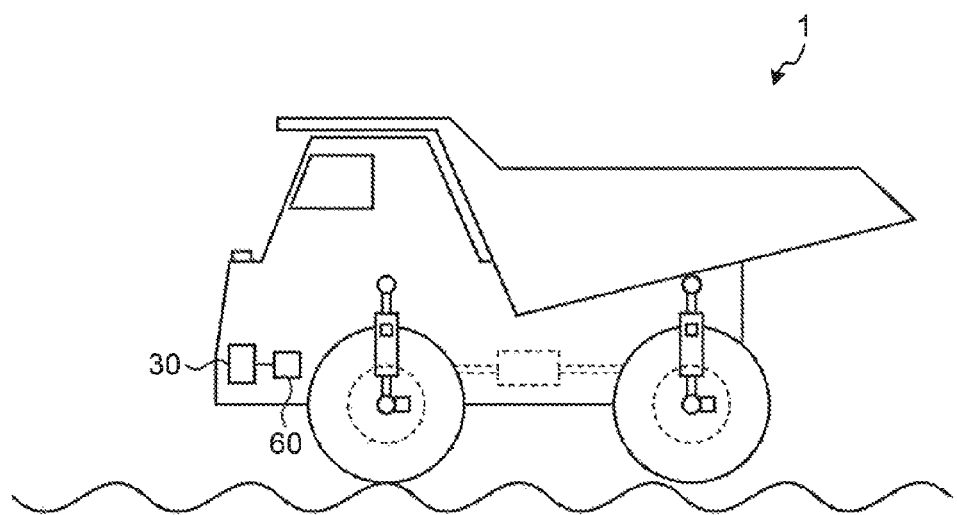
FIG. 17 is a schematic view illustrating an example of the transporter vehicle.

FIG. 17 is a schematic view illustrating an example of the dump truck 1 according to the embodiment. The embodiment is a modification of the fourth embodiment. In the embodiment, the unevenness information of the traveling road HL is output to the control device 30 when the dump truck 1 travels along the traveling road HL.

In the example illustrated in FIG. 17, the dump truck 1 includes a detection device 60 capable of detecting the unevenness information of the traveling road HL. The detection device 60 includes an acceleration sensor, and detects the unevenness information of the traveling road HL by detecting the vertical acceleration of the dump truck 1 traveling along the traveling road HL. The detection device 60 includes an optical sensor capable of detecting the unevenness information of the traveling road HL in a non-contact state, and may detect the unevenness information of the traveling road HL based on the detection result of the optical sensor.

There is a possibility that the dump truck 1 traveling along the traveling road HL may be vibrated in the vertical direction by the unevenness of the traveling road HL. Further, there is a possibility that the detection value of the loading state detection device 11 may be changed due to the vibration of the dump truck 1. When the deceleration a is set based on the changed detection value of the loading state detection device 11, there is a possibility that an appropriate deceleration a may not be set.

In the embodiment, the control device 30 corrects the detection value of the loading state detection device 11 based on the detection result of the detection device 60. The control device 30 corrects the detection value of the loading state detection device 11 based on the detection result of the detection device 60 so that a change in the detection value of the loading state detection device 11 caused by the vertical vibration of the dump truck 1 due to the unevenness of the traveling road HL is cancelled. The control device 30 sets the deceleration a based on the corrected detection value of the loading state detection device 11.

As described above, according to the embodiment, when there is a possibility that the detection value of the loading state detection device 11 may be changed by the unevenness of the traveling road HL, the information on the weight of the load may be accurately acquired by correcting the detection value of the loading state detection device 11 based on the unevenness information of the traveling road HL. Accordingly, an appropriate deceleration a may be set based on the accurately acquired information on the weight of the load.

Sixth Embodiment

A sixth embodiment will be described. In the description below, the same reference numerals will be given to the same or identical components to the above-described embodiment, and the description thereof will be simplified or omitted.

Figure 18:
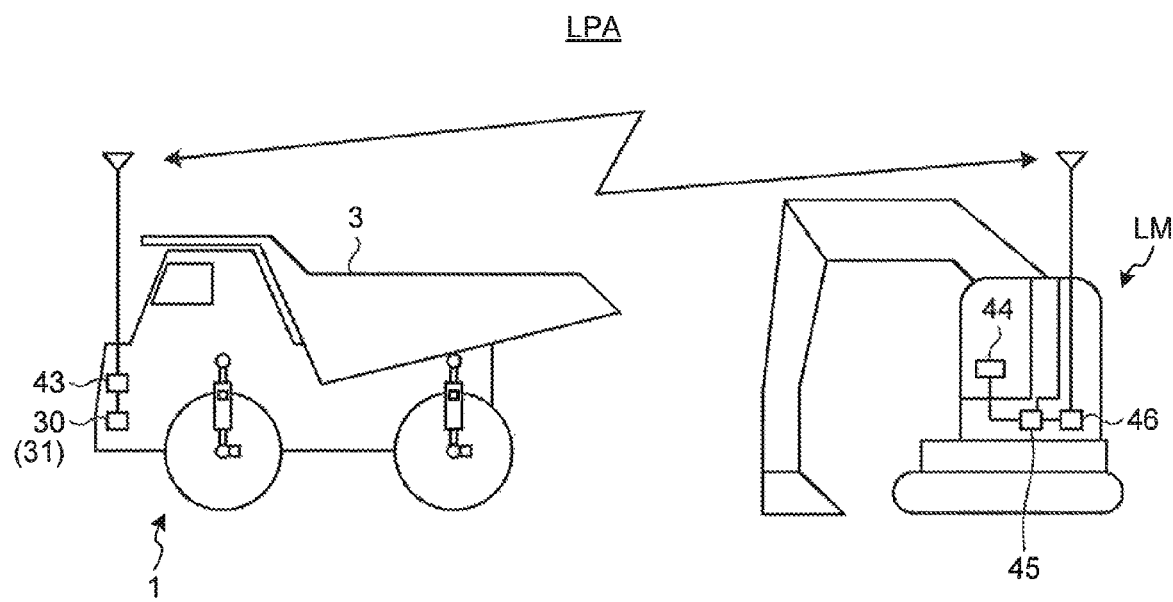
FIG. 18 is a view illustrating an example of the transporter vehicle and the loading machine.

FIG. 18 is a view illustrating an example of the dump truck 1 according to the embodiment. As illustrated in FIG. 18, a load is loaded on the vessel 3 by the loading machine LM in the loading field LPA. The dump truck 1 includes a communication device 43 capable of communicating with a communication device 46 of the loading machine LM. The loading machine LM includes a control device 45 and an operation unit 44.

After the loading operation is completed, the information on the loading state of the load of the vessel 3 is output from the loading machine LM to the control device 30 (the collision determination unit 31) through the communication device 46 and the communication device 43. In the embodiment, the information on the loading state includes the information on the completion of the loading operation. The completion of the loading operation includes the state where a load is loaded on the vessel 3. A load is loaded on the vessel 3 by the completion of the loading operation.

After the loading operation is completed, the operation unit 44 of the loading machine LM is operated by the operator. An operation signal which is generated by the operation of the operation unit 44 is output to the control device 45. The control device 45 outputs the information on the completion of the loading operation to the control device 30 through the communication device 46 and the communication device 43.

The control device 30 determines that the vessel 3 is in the loaded state (a state where a load is loaded on the vessel 3) based on the information on the completion of the loading operation supplied from the loading machine LM. When it is determined that the vessel 3 is in the loaded state, the control device 30 sets the deceleration a1.

As described above, according to the embodiment, the loading state of the load of the vessel 3 may be determined based on the loading operation of the loading machine LM without using the operation of the dump truck 1 by the operator WM.

Seventh Embodiment

A seventh embodiment will be described. In the description below, the same reference numerals will be given to the same or identical components to the above-described embodiment, and the description thereof will be simplified or omitted.

Figure 19:
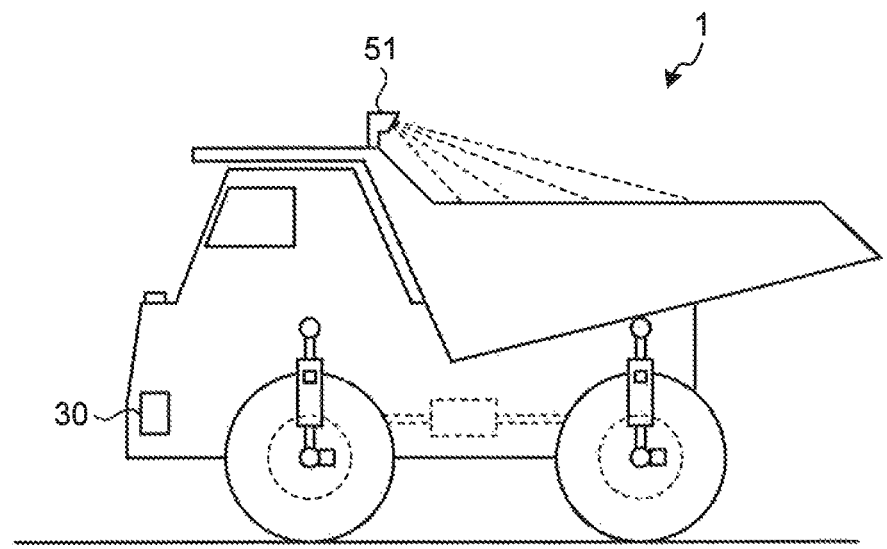
FIG. 19 is a schematic view illustrating an example of the transporter vehicle.

FIG. 19 is a view illustrating an example of the dump truck 1 according to the embodiment. As illustrated in FIG. 19, the dump truck 1 includes a loading state detection device 51 which detects the loading state of the vessel 3. The loading state detection device 51 includes an optical device capable of detecting the state whether a load exists in the vessel 3 in a non-contact state. The optical device may include an imaging device which captures an image or a laser device. The existence of the load in the vessel 3 is detected by the loading state detection device 51.

As described above, the loading state of the load of the vessel 3 may be detected by the loading state detection device 51 including not only the weight sensor, but also the optical device.

Eighth Embodiment

An eighth embodiment will be described. In the description below, the same reference numerals will be given to the same or identical components to the above-described embodiment, and the description thereof will be simplified or omitted.

Figure 20:
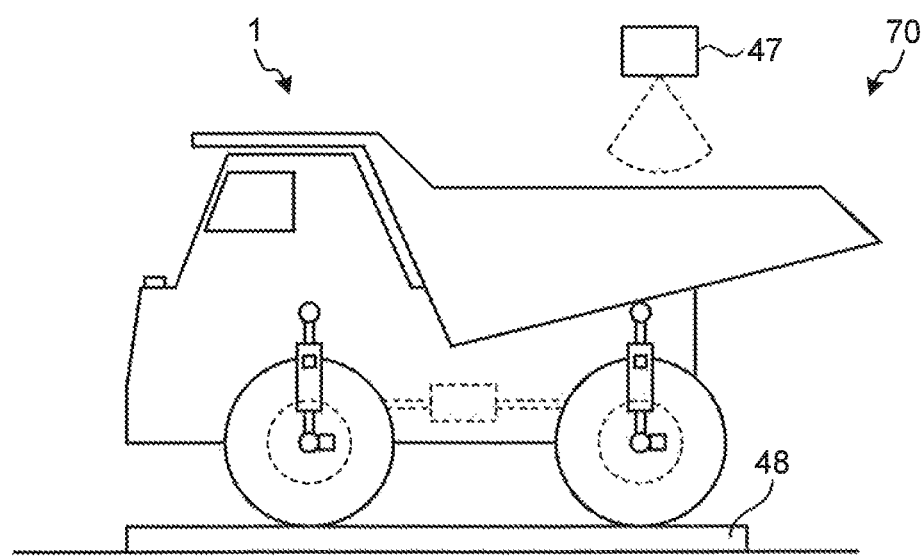
FIG. 20 is a schematic view illustrating an example of a detection system.

FIG. 20 is a view illustrating an example of the dump truck 1 according to the embodiment. As illustrated in FIG. 20, a detection system 70 which detects the loading state of the load of the vessel 3 is provided in the loading field LPA (or the soil disposal field DPA).

The detection system 70 detects the loading state of the load of the vessel 3 when the dump truck 1 starts to move from the loading field LPA or the soil disposal field DPA. The detection system 70 includes an optical device 47 which is separated from the dump truck 1 and is able to detect the existence of the load of the vessel 3 in a non-contact state. The optical device 47 may include an imaging device which captures an image or a laser device. Furthermore, the optical device 47 may be mounted on the loading machine LM. The existence of the load of the vessel 3 is detected by the optical device 47.

Alternatively, the detection system 70 includes a weight detection device 48 capable of detecting the weight of the dump truck 1. The weight detection device 48 includes a placement portion on which the dump truck 1 may be placed. The dump truck 1 is placed on the placement portion of the weight detection device 48 when starting to move from the loading field LPA or the soil disposal field DPA. Thus, the weight of the dump truck 1 is detected. The weight of the dump truck 1 is different depending on the existence of the load in the vessel 3. The existence of the load of the vessel 3 is detected by the weight detection device 48.

The detection system 70 may include a sensor which detects an impact generated when a load is loaded on the vessel 3. When the impact is detected by the sensor, it is possible to determine that the vessel 3 changes from the empty state to the loaded state. In this case, a sensor which detects the impact may be mounted on the dump truck 1 without being separated from the dump truck 1.

The detection result of the detection system 70 is output to the control device 30 through a wireless communication device. When it is determined that the vessel 3 is in the loaded state based on the detection result of the detection system 70, the control device 30 sets the acceleration a1. Then, when it is determined that the vessel 3 is in the empty state, the control device 30 sets the acceleration a2.

As described above, the loading state of the load of the vessel 3 may be detected by using the detection system 70 disposed in the traveling road of the dump truck 1.

Ninth Embodiment

A ninth embodiment will be described. In the description below, the same reference numerals will be given to the same or identical components to the above-described embodiment, and the description thereof will be simplified or omitted.

Figure 21:
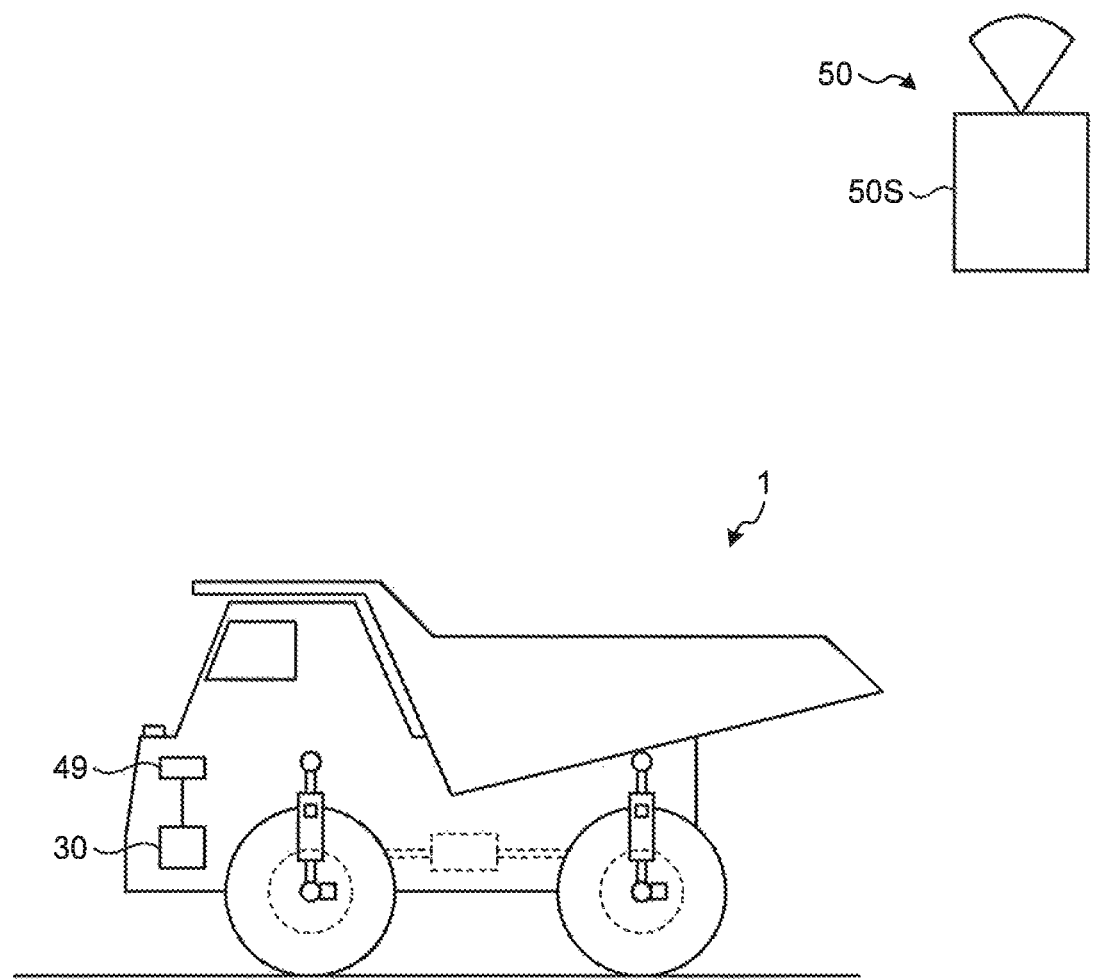
FIG. 21 is a schematic view illustrating an example of the transporter vehicle.

FIG. 21 is a view illustrating an example of the dump truck 1 according to the embodiment. As illustrated in FIG. 21, the position of the dump truck 1 is detected by a global positioning system (GPS) 50. The global positioning system 50 includes a GPS satellite 50S, and detects the position in the coordinate system (the GPS coordinate system) for defining the latitude, the longitude, and the altitude. By the global positioning system 50, the position of the dump truck 1 in the mine is detected. The dump truck 1 includes a GPS receiver 49. The control device 30 acquires the position of the dump truck 1 based on the detection result of the GPS receiver 49.

The control device 30 may determine whether the dump truck 1 starts to move from the loading field LPA or the soil disposal field DPA based on the detection result of the GPS receiver 49. The position information of the loading field LPA and the position information of the soil disposal field DPA are given. The control device 30 may determine a position where the dump truck 1 exists based on the position information of the loading field LPA, the position information of the soil disposal field DPA, and the position information obtained by the GPS receiver 49, and may determine whether the dump truck 1 starts to move from the loading field LPA or the soil disposal field DPA based on the advancing direction of the dump truck 1 determined by the GPS receiver 49.

The dump truck 1 which starts to move from the loading field LPA travels in the loaded state. The dump truck 1 which starts to move from the soil disposal field DPA travels in the empty state. Accordingly, the control device 30 may determine whether the dump truck 1 is in the loaded state or the empty state based on the detection result of the GPS receiver 49.

The control device 30 sets the deceleration a1 when the dump truck 1 travels from the loading field LPA. The control device 30 sets the deceleration a2 when the dump truck 1 travels from the soil disposal field DPA.

As described above, it is possible to detect the existence of the load of the vessel 3 by using the global positioning system 50.

Furthermore, in the first to ninth embodiments, a relation between the deceleration a and the weight of the dump truck 1 including a load is obtained in advance by an experiment or a simulation performed before the operation of the dump truck 1 in the mine, and the relation is stored in the storage unit 34. For example, a configuration may be employed in which a traveling test for obtaining the deceleration a1 of the dump truck 1 operated in the mine in the loaded state at the loading field LPA is performed and the deceleration a1 is set based on the result of the traveling test. Based on the set deceleration a1, the possibility of collision of the dump truck 1 traveling on the traveling road HL in the loaded state is determined. Further, a configuration may be employed in which a traveling test for obtaining the deceleration a2 of the dump truck 1 operated in the mine in the empty state at the soil disposal field DPA is performed and the deceleration a2 is set based on the result of the traveling test. Based on the set deceleration a2, the possibility of collision of the dump truck 1 traveling along the traveling road HL in the empty state is determined.

Furthermore, in the above-described embodiments, the vehicle body 5 of the dump truck 1 is divided into the front part and the rear part, and an articulate dump truck of which the front part and the rear part are coupled to each other by free joints may be used.

Furthermore, in the above-described embodiments, the dump truck 1 travels by itself while recognizing the ground form around the own vehicle. However, a configuration may be employed in which the dump truck 1 stores the position information on the traveling road HL and travels by itself according to the position information while checking the position of the own vehicle by the GPS receiver or the like.

Furthermore, in the above-described embodiments, the dump truck 1 may be used not only in the mining site of the mine, but also, for example, the construction site of the dam.

REFERENCE SIGNS LIST

1 DUMP TRUCK
2 VEHICLE
3 VESSEL
4 TRAVELING DEVICE
9 SUSPENSION CYLINDER
10 TRAVELING STATE DETECTION DEVICE
11 LOADING STATE DETECTION DEVICE
12 OBJECT DETECTION DEVICE
13 BRAKE DEVICE
14 STEERING DEVICE
20 DISPLAY DEVICE
21 ALARM DEVICE
28 RETARDER
30 CONTROL DEVICE
31 COLLISION DETERMINATION UNIT
32 CALCULATION UNIT
33 VARIABLE SETTING UNIT
34 STORAGE UNIT
35 CONTROL UNIT
400 STATE QUANTITY DETECTION SYSTEM
500 TRAVELING CONDITION ADJUSTMENT SYSTEM
600 PROCESS SYSTEM
HL TRAVELING ROAD

The invention claimed is:

1. A transporter vehicle comprising:
a vehicle;
a vessel that is provided in the vehicle;
a traveling state detection device that detects a traveling state of the vehicle;
an object detection device that detects an object in front of the vehicle;
a detection unit that detects a loading state of a load of the vessel; and
a collision determination unit that determines a possibility of collision with the object based on a deceleration of the vehicle set based on the loading state of the load of the vessel detected by the detection unit, a detection result of the traveling state detection device, and a detection result of the object detection device; and
a calculation unit that
calculates, based on a traveling speed of the vehicle at a first point detected by the traveling state detection device and the deceleration, a required stop distance between the first point and a second point where the vehicle can be stopped,
calculates a stop distance passage time from a first time point at which the vehicle exists at the first point to a second time point at which the vehicle arrives at the second point when the vehicle travels by the required stop distance at the traveling speed from the first time point, and calculates, based on a relative distance and a relative speed of the object and the vehicle at the first time point detected by the object detection device, an object arrival time from the first time point to a third time point at which the vehicle arrives at the object when the vehicle travels by the relative distance at the relative speed from the first time point, wherein the collision determination unit determines the possibility of collision based on the stop distance passage time and the object arrival time.

2. The transporter vehicle according to claim 1, further comprising:

a variable setting unit that sets the deceleration of the vehicle based on the loading state of the load of the vessel, wherein the collision determination unit determines the possibility of collision by estimating a time until the collision with the object occurs based on the deceleration set by the variable setting unit, the detection result of the traveling state detection device, and the detection result of the object detection device.

3. The transporter vehicle according to claim 2, further comprising:

a calculation unit that calculates, based on a traveling speed of the vehicle at a first point detected by the traveling state detection device and the deceleration set by the variable setting unit, a required stop distance between the first point and a second point where the vehicle can be stopped, calculates a stop distance passage time from a first time point at which the vehicle exists at the first point to a second time point at which the vehicle arrives at the second point when the vehicle travels by the required stop distance at the traveling speed, and calculates, based on a relative distance and a relative speed of the object and the vehicle at the first time point detected by the object detection device, an object arrival time from the first time point to a third time point at which the vehicle arrives at the object when the vehicle travels by the relative distance at the relative speed from the first time point, wherein the collision determination unit determines the possibility of collision based on the stop distance passage time and the object arrival time.

4. The transporter vehicle according to claim 1, further comprising:

a process system capable of performing a process for reducing damage caused by the collision; and a control unit that outputs a signal for reducing damage caused by the collision to the process system based on a determination result of the collision determination unit.

5. The transporter vehicle according to claim 4, wherein the process system includes a plurality of process devices capable of performing different processes, and wherein the control unit outputs the signal to a specific process device based on the determination result of the collision determination unit.

6. The transporter vehicle according to claim 5, wherein the determination of the collision determination unit includes a classification of the possibility of collision into a plurality of levels, and wherein the control unit outputs the signal to a specific process device based on the level.

7. The transporter vehicle according to claim 4, wherein the process devices include at least one of an alarm device capable of performing an alarm generation process, a braking device capable of performing a brake process on a traveling device of the vehicle, and a power generation device capable of performing an output reduction process of reducing a driving force for the traveling device of the vehicle.

8. The transporter vehicle according to claim 1, wherein a detection result of the detection unit is output to the collision determination unit.

9. The transporter vehicle according to claim 1, wherein the detection unit includes a weight sensor that detects a weight of the vessel.

10. The transporter vehicle according to claim 1, wherein the loading state includes a state whether a load exists in the vessel.

11. The transporter vehicle according to claim 10, wherein a load is loaded on the vessel in a loading field of a mine, the vehicle travels from the loading field to a soil disposal field of the mine, and the load is discharged in the soil disposal field, wherein a first deceleration is set when the vehicle travels after the load is loaded in the loading field, and wherein a second deceleration larger than the first deceleration is set when the vehicle travels after the load is discharged in the soil disposal field.

12. The transporter vehicle according to claim 1, wherein a load is loaded on the vessel by a loading machine in the loading field, and wherein information on the loading state of the vessel is output from the loading machine to the collision determination unit.

13. A transporter vehicle comprising:

a vehicle;

a vessel that is provided in the vehicle;

a traveling state detection device that detects a traveling state of the vehicle;

an object detection device that detects an object in front of the vehicle;

a collision determination unit that determines a possibility of collision with the object based on a loading state of a load of the vessel, a detection result of the traveling state detection device, and a detection result of the object detection device;

a variable setting unit that sets a deceleration of the vehicle based on the loading state of the load of the vessel; and a calculation unit that calculates, based on a traveling speed of the vehicle at a first point detected by the traveling state detection device and the deceleration, a required stop distance between the first point and a second point where the vehicle can be stopped, calculates a stop distance passage time from a first time point at which the vehicle exists at the first point to a second time point at which the vehicle arrives at the second point when the vehicle travels by the required stop distance at the traveling speed from the first time point, and calculates, based on a relative distance and a relative speed of the object and the vehicle at the first time point detected by the object detection device, an object arrival time from the first time point to a third time point at which the vehicle arrives at the object when the vehicle travels by the relative distance at the relative speed from the first time point, wherein the collision determination unit estimates a time until the collision with the object occurs based on the deceleration set by the variable setting unit, the detection result of the traveling state detection device, and determines the possibility of collision based on the stop distance passage time and the object arrival time.

14. A transporter vehicle control method comprising:
detecting a traveling state of a transporter vehicle including a vessel by a traveling state detection device provided in the transporter vehicle;
detecting an object in front of the transporter vehicle by an object detection device provided in the transporter vehicle;
detecting a loading state of a load of the vessel;
determining a possibility of collision between the transporter vehicle and the object based on the detected load of the vessel, a detection result of the traveling state detection device, and a detection result of the object detection device;
calculating, based on a traveling speed of the vehicle at a first point detected by the traveling state detection device and the deceleration, a required stop distance between the first point and a second point where the vehicle can be stopped;
calculating a stop distance passage time from a first time point at which the vehicle exists at the first point to a second time point at which the vehicle arrives at the second point when the vehicle travels by the required stop distance at the traveling speed from the first time point;
calculating, based on a relative distance and a relative speed of the object and the vehicle at the first time point detected by the object detection device, an object arrival time from the first time point to a third time point at which the vehicle arrives at the object when the vehicle travels by the relative distance at the relative speed from the first time point; and
determining the possibility of collision based on the stop distance passage time and the object arrival time.

15. The transporter vehicle control method according to claim 14, further comprising:
setting the deceleration of the transporter vehicle based on the loading state of the load of the vessel; and
estimating a time until the transporter vehicle and the object collide with each other based on the set deceleration, the detection result of the traveling state detection device, and the detection result of the object detection device,
wherein the possibility of collision is determined based on the estimated time.

16. The transporter vehicle control method according to claim 15, further comprising:
calculating, based on a deceleration and a traveling speed of the transporter vehicle at a first point detected by the traveling state detection device, a required stop distance between the first point and a second point where the transporter vehicle can be stopped;
calculating a stop distance passage time from a first time point at which the transporter vehicle exists at the first point to a second time point at which the transporter vehicle arrives at the second point when the transporter vehicle travels by the required stop distance at the traveling speed from the first time point;
calculating, based on a relative distance and a relative speed of the object and the transporter vehicle at the first time point detected by the object detection device, an object arrival time from the first time point to a third time point at which the transporter vehicle arrives at the object when the transporter vehicle travels by the relative distance at the relative speed from the first time point; and
comparing the stop distance passage time with the object arrival time,
wherein the possibility of collision is determined based on a comparison result.

17. The transporter vehicle control method according to claim 15,
wherein a load is loaded on the vessel in a loading field of a mine, the transporter vehicle travels from the loading field to a soil disposal field of the mine, and the load is discharged from the vessel in the soil disposal field,
wherein a first deceleration is set when the transporter vehicle travels after the load is loaded in the loading field, and
wherein a second deceleration larger than the first deceleration is set when the transporter vehicle travels after the load is discharged in the soil disposal field.

18. The transporter vehicle according to claim 1,
wherein the detection unit includes a pressure sensor.

19. The transporter vehicle according to claim 1,
wherein the detection unit includes a first operation unit and a second operation unit, and
when a load is loaded on the vessel, the first operation unit is operated by an operator, and when the vessel is empty, the second operation unit is operated by the operator.

20. The transporter vehicle according to claim 1,
wherein the detection unit includes an operation unit of a loading machine, a load being loaded on the vessel by the loading machine, and
after a loading operation is completed, the operation unit of the loading machine is operated by the operator.

21. The transporter vehicle according to claim 1,
wherein the detection unit includes an imaging device which captures an image or a laser device, the imaging device or the laser device being mounted in the transporter vehicle.

22. The transporter vehicle according to claim 1,
wherein the detection unit includes an optical device or a weight detection device which is mounted outside the transporter vehicle.

23. The transporter vehicle according to claim 1,
wherein the detection unit includes a GPS (global positioning system) receiver.

* * * * *